US006561520B2

(12) United States Patent
Kalsi et al.

(10) Patent No.: US 6,561,520 B2
(45) Date of Patent: May 13, 2003

(54) HYDRODYNAMIC ROTARY COUPLING SEAL

(75) Inventors: Manmohan S. Kalsi, Houston, TX (US); Lannie M. Dietle, Houston, TX (US); William Conroy, Pearland, TX (US); John E. Schroeder, Richmond, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 105 days.

(21) Appl. No.: 09/776,026

(22) Filed: Feb. 2, 2001

(65) Prior Publication Data

US 2001/0045704 A1 Nov. 29, 2001

Related U.S. Application Data

(60) Provisional application No. 60/179,658, filed on Feb. 2, 2000.

(51) Int. Cl.[7] ................................................. F16J 15/32
(52) U.S. Cl. ........................ 277/559; 277/500; 277/549
(58) Field of Search ............................... 277/400, 403, 277/559

(56) References Cited

U.S. PATENT DOCUMENTS 3,838,862 A * 10/1974 Fern
3,929,340 A * 12/1975 Peisker
5,171,027 A * 12/1992 Domkowski et al.
5,230,520 A    7/1993 Dietle et al.
5,711,534 A *  1/1998 Bengoa et al.
5,738,358 A    4/1998 Kalsi et al.
5,873,576 A *  2/1999 Dietle et al.
5,979,865 A   11/1999 Rabby
6,105,970 A    8/2000 Siegrist et al.
6,109,618 A *  8/2000 Dietle
6,120,036 A    9/2000 Kalsi et al.
6,189,896 B1 * 2/2001 Dickey et al.
6,315,302 B1 * 11/2001 Conroy et al.

FOREIGN PATENT DOCUMENTS

EP          0643243      7/1994

* cited by examiner

Primary Examiner—Anthony Knight
Assistant Examiner—Enoch E Peavey
(74) Attorney, Agent, or Firm—James L. Jackson; Andrews & Kurth, LLP

(57) ABSTRACT

A rotary seal is provided that operates hydrodynamically in response to relative rotation even when subjected to exposure to a high fluid pressure from either side, and provides low breakout and running torque. A dynamic sealing lip having a wavy geometry provides hydrodynamic lubrication in response to relative rotation when little or no differential pressure is acting across the seal. When differential pressure exists, controlled fluid pressure-induced distortion results in a distorted dynamic sealing lip configuration that is suitable for hydrodynamic lubrication, regardless of which direction the differential pressure acts from.

27 Claims, 8 Drawing Sheets

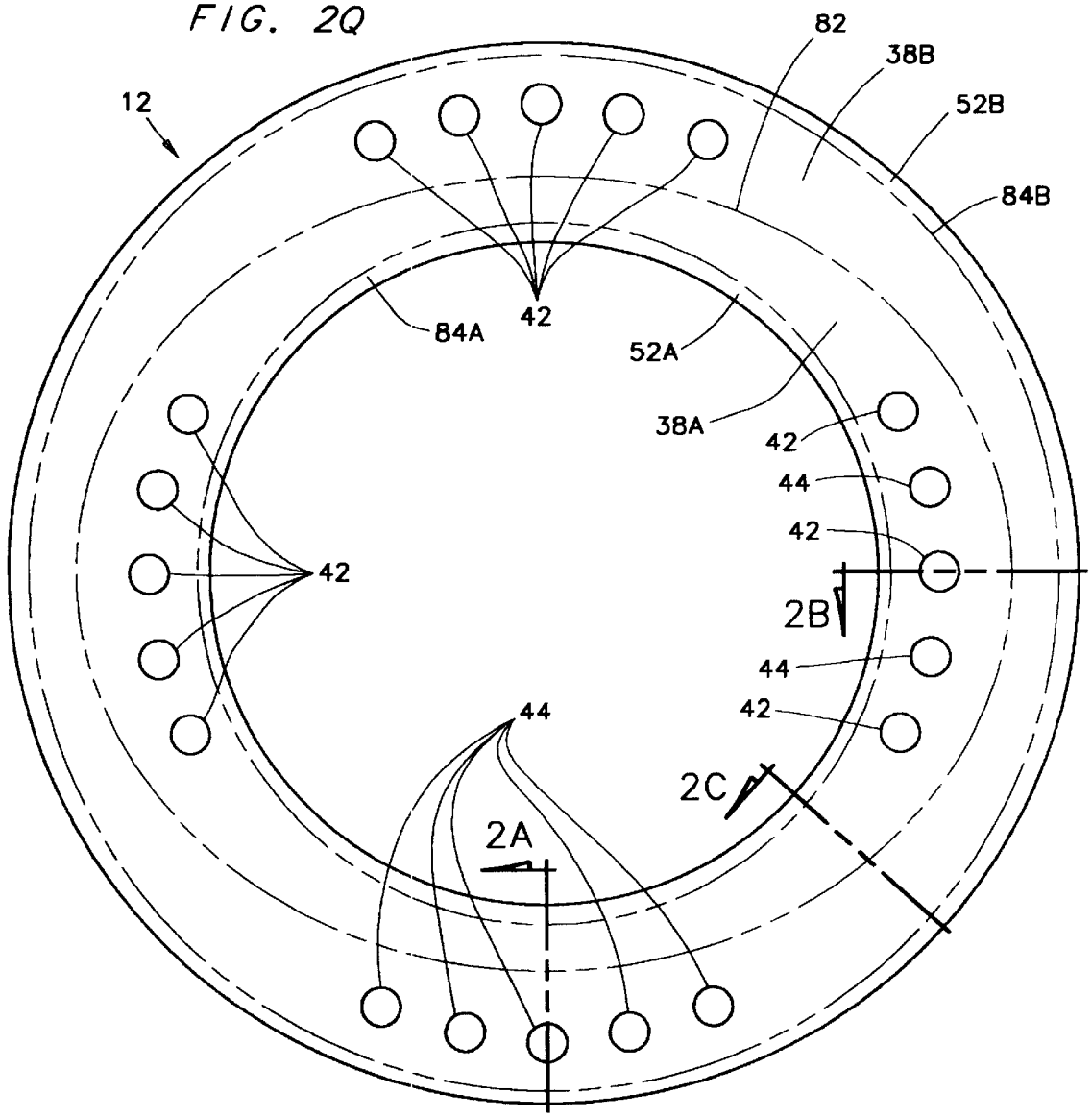

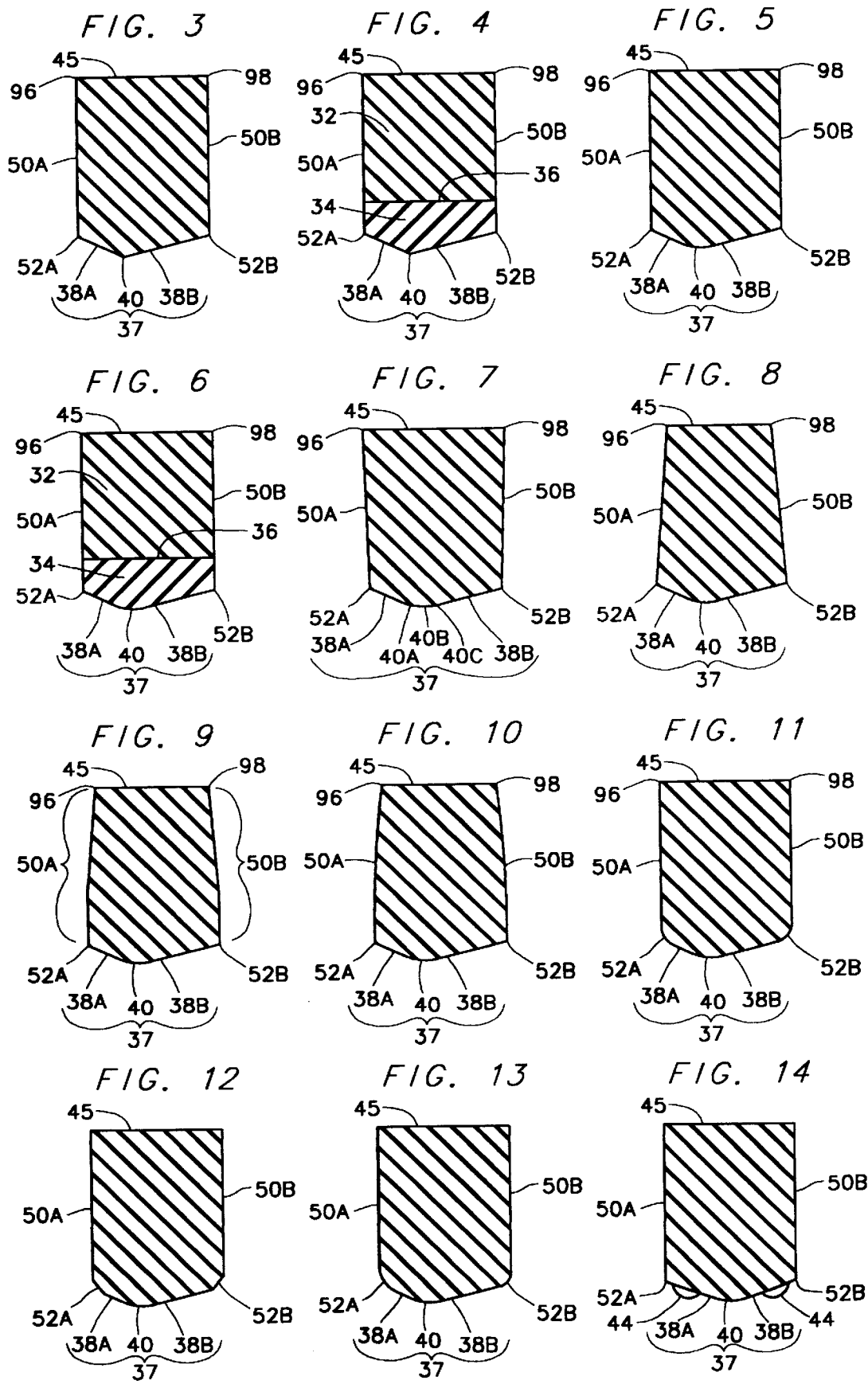

HYDRODYNAMIC ROTARY COUPLING SEAL

Applicants hereby claim the benefit of U.S. Provisional Application Ser. No. 60/179,658 filed on Feb. 2, 2000 by Lannie Dietle entitled "Rotary Valve Actuator Seal", which provisional application is incorporated herein by reference for all purposes.

BACKGROUND OF THE INVENTION

This invention relates to overcoming a limitation of the commonly assigned prior art rotary seals of U.S. Pat. Nos. 5,230,520, 5,738,358, and 6,120,036. When such rotary seals are used in devices such as that shown in U.S. Pat. No. 5,979,865, wherein a plurality of rotary seals define a plurality of fluid communication passages between a seal carrier and a relatively rotatable member, at least one of the rotary seals is subject to pressure acting from either side, depending upon which of the fluid communication passages are pressurized at any given time.

The above-referenced prior art rotary seals are generally circular in configuration, and are compressed between the relatively rotatable member and an annular seal groove of the seal carrier. Such seals incorporate a dynamic sealing lip having a generally circular dynamic sealing surface for establishing sealing relation with the relatively rotatable member. The dynamic sealing surface has a circular edge at one side thereof for exclusion purposes and has a wavy edge at the opposite side thereof for hydrodynamically wedging a lubricating film into the dynamic sealing interface between the dynamic sealing surface and the relatively rotatable member.

The prior art seals are best suited for applications in which fluid pressure at the wavy edge of the dynamic sealing surface is either higher than, or substantially balanced with, the fluid pressure at the circular edge. When the fluid pressure of the wavy edge is higher than the fluid pressure at the circular edge, the dynamic sealing lip is supported by the seal groove in a manner that resists pressure-induced distortion of the seal, and the hydrodynamic wedging function of the wavy edge remains unimpaired. When the fluid pressure at the circular edge of the dynamic sealing surface is significantly higher than the fluid pressure at the wavy edge, the dynamic sealing lip is not well supported by the seal groove and severe pressure-induced distortion of the seal can impair the hydrodynamic wedging function of the wavy edge, and can also increase the breakout and running torque of the seal, and increase wear of the seal and the mating relatively rotatable member.

Many applications, such as (but not limited to) the rotary device shown in U.S. Pat. No. 5,979,865, would benefit significantly from a rotary seal that provides low breakout and running torque when subjected to a high differential pressure acting from either side.

SUMMARY OF THE INVENTION

The objective of the present invention is to provide a simple and compact, low torque, wear resistant high pressure compression or interference-type rotary seal for applications where the seal may be exposed to relatively high differential pressure acting from either side. The invention also relates to and encompasses rotating machinery such as top drive hydraulic rotary actuators and rotating unions/couplings/swivels wherein rotary seals are used as partitions defining two or more hydraulic circuits.

Briefly, the principles of the present invention are achieved by a hydrodynamic seal for location within an annular seal gland and subject to lubricating fluid pressure for hydrodynamically lubricated sealing with a relatively rotatable surface and for accommodating conditions of lubricant pressure reversal. The seal, in its simplest form has an annular seal body having a primary sealing geometry having angulated tilting surfaces which are merged at the intersection thereof by a blending/pivoting geometry located intermediate opposed flanks of the seal. The blending geometry and its relationship with the angulated tilting surfaces defines a pivotal characteristic with respect to the relatively rotatable surface enabling the annular seal body to be pivotally moved to a first position within the annular seal gland responsive to lubricant pressure from one direction and to establish hydrodynamic sealing with the relatively rotatable surface. The blending/pivoting geometry and its relationship with the angulated tilting surfaces also enables the annular seal body to be pivotally moved to a second position within the annular seal gland responsive to lubricant pressure from the opposite direction and to establish hydrodynamic sealing with the relatively rotatable surface. The seal of the present invention is capable of functioning as a seal for hydrodynamic sealing engagement with an outer cylindrical surface, such as a shaft surface, an inner cylindrical surface, such as an internal housing surface or a planar sealing surface, such as the shoulder surface of a rotatable shaft of housing or the end surface of a rotating member.

At both the first and second positions within the annular seal gland the respective sealing geometry in sealing engagement with the relatively rotatable surface can define a substantially circular non-hydrodynamic edge at the low pressure side thereof and an non-circular hydrodynamic edge at the high pressure side thereof. The blending/pivoting geometry and the angulated tilting surfaces cooperatively define a hydrodynamic geometry for contact with the relatively rotatable surface regardless of the position of the seal with the seal gland.

The annular seal body is also capable of establishing a substantially neutral position within the seal gland when lubricant pressure from either direction is below a predetermined level, with the blending/pivoting geometry the angulated tilting surfaces establishing hydrodynamic geometry at their engagement with the relatively rotatable surface. The annular seal body is capable of rolling movement within the annular seal gland, being rolled to the first or second positions or to the neutral position by the force of differential pressure acting thereon.

The opposed flanks of said annular seal body define annular flank surfaces preferred to be disposed in angulated relation with one another and rendering said annular seal body more susceptible to rolling/pivoting movement within the annular seal gland responsive to reversal of differential pressure acting on said annular seal body.

Preferably the annular seal body is of dual material construction having an energizing section composed of a resilient material having a predetermined range of durometer hardness and having an extrusion resistant section composed of a different material having a range of higher durometer hardness to minimize the potential for pressure extrusion thereof into the extrusion gap that typically exists between the relatively rotatable surface and the structure that houses the seal. Extrusion resistance of the seal is also enhanced by flank corner treatment or geometry which is designed to accommodate the pressure conditions and the fluid characteristics.

The annular seal body may also be provided with lubricating characteristics, such as lubricating projections, lubricating pools and lubricating recesses which are located on the annular tilting surfaces of the primary dynamic sealing geometry and which contain or accumulate quantities of lubricant or direct lubricant migration within the dynamic sealing interface of the seal with the relatively rotatable surface.

The annular seal body may also define a sliding or secondary sealing geometry for static sealing with a surface of the annular seal gland and which slides with respect to the annular seal gland during pressure responsive movement of said annular seal body between its pressure responsive positions. The secondary sealing geometry defines angulated sliding surfaces located in generally opposed relation with the primary sealing geometry and with annular blending geometry merging the annular angulated sliding surfaces substantially intermediate said side flanks of the seal. The annular blending geometry preferably has varying location with respect to the angulated sliding geometry and defines at least one varying edge or wave for hydrodynamic sealing engagement with the relatively rotatable surface. Under circumstances where friction conditions cause the seal to spin within the seal gland the secondary sealing geometry establishes hydrodynamic lubrication at the sealing interface thereof with a gland surface and thus minimizes the potential for heat build-up or unusual seal wear due to this circumstance.

BRIEF DESCRIPTION OF THE DRAWINGS

So that the manner by which the above recited features, advantages and objects of the present invention are attained and can be understood in detail, a comprehensive description of the invention, briefly summarized above, may be had by reference to the embodiments thereof which are illustrated in the appended drawings. It is to be noted, however, that the appended drawings only illustrate typical embodiments of this invention, and are therefore not to be considered limiting of its scope, for the invention admits to other equally effective embodiments.

IN THE DRAWINGS

Figure 1:
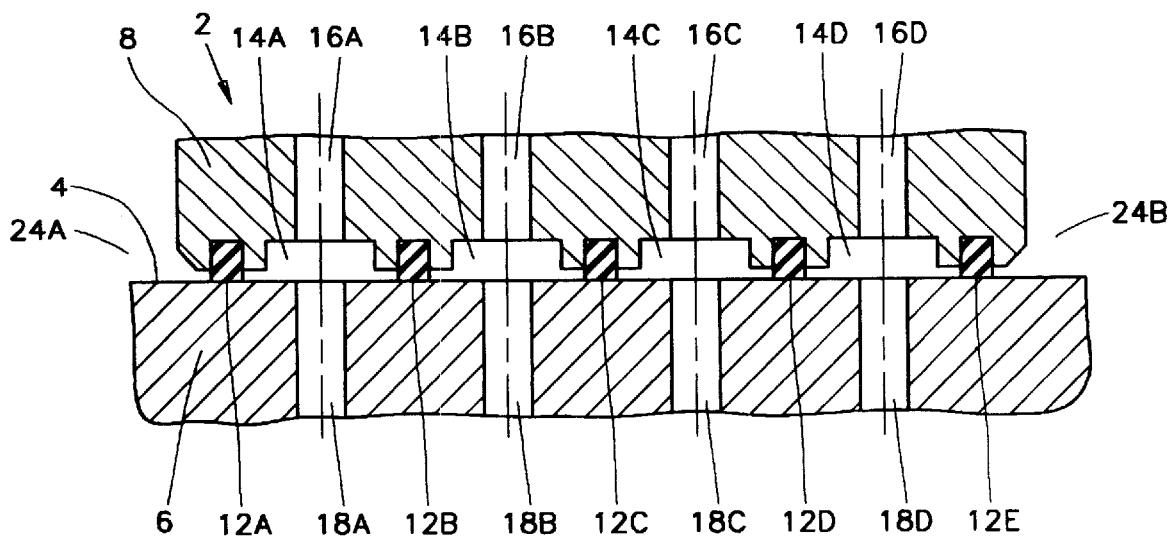
Figure 2A:
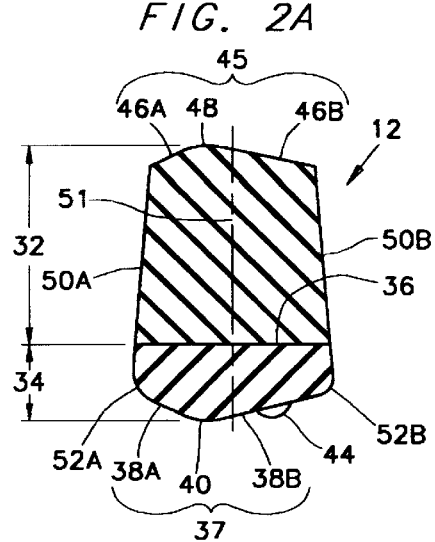
Figure 2B:
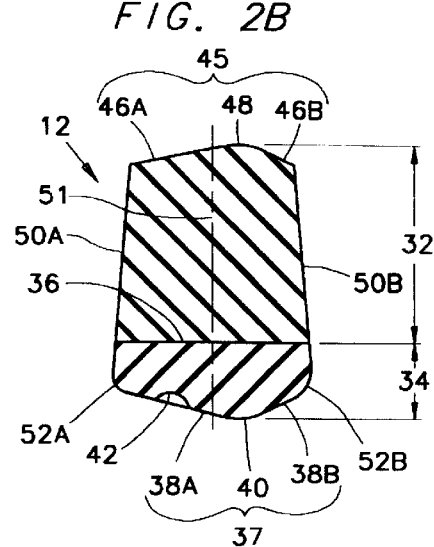
Figure 2C:
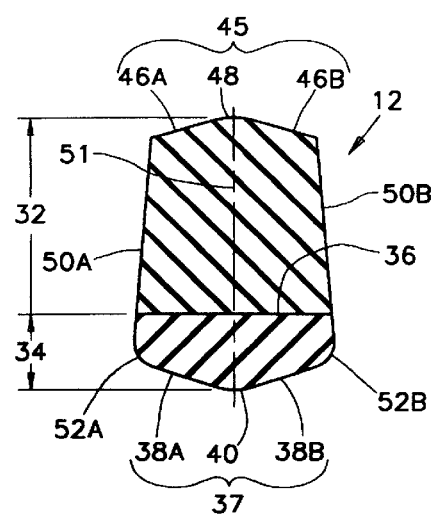
Figure 2D:
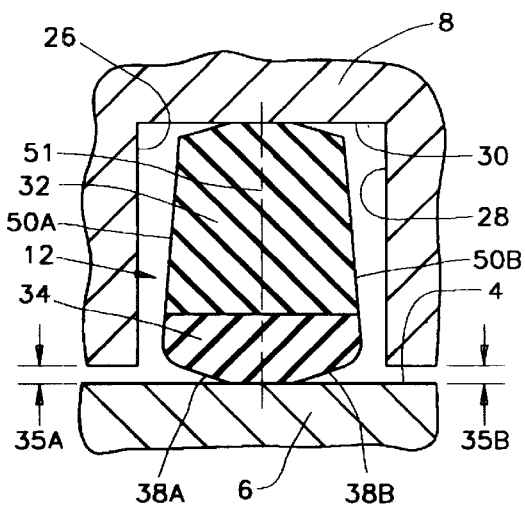
Figure 2E:
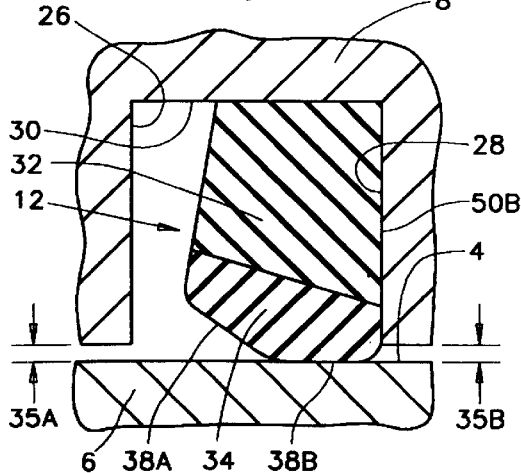
Figure 2F:
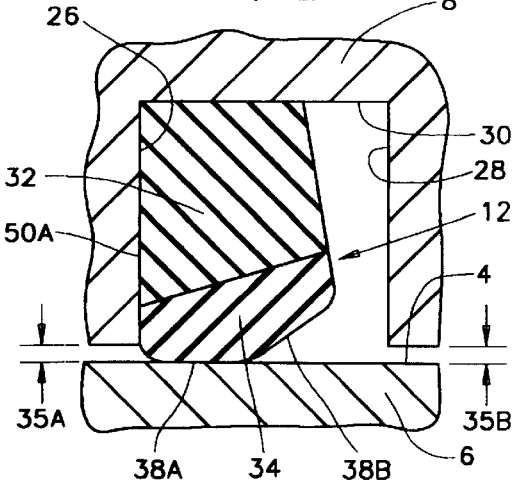
Figure 2G:
Figure 2H:
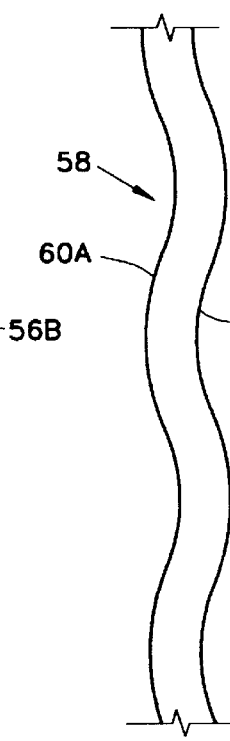
Figure 2J:
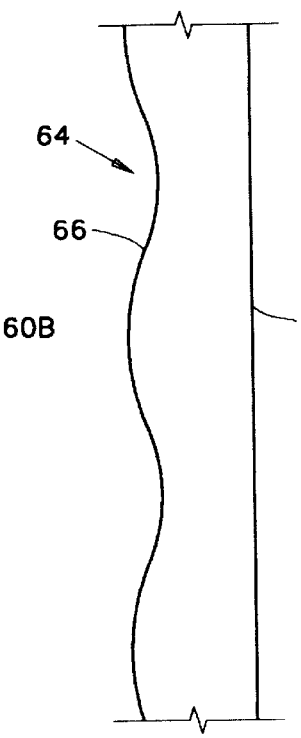
Figure 2K:
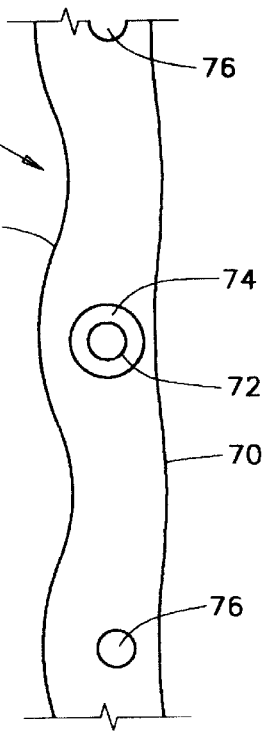
Figure 2L:
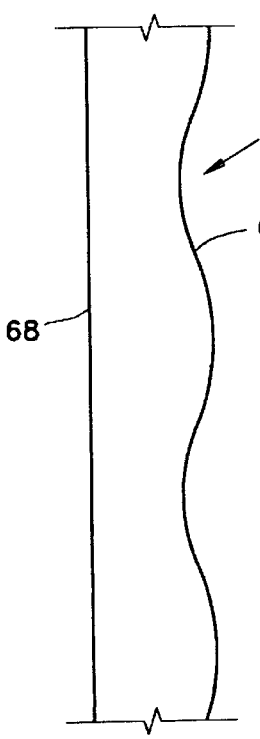
Figure 2M:
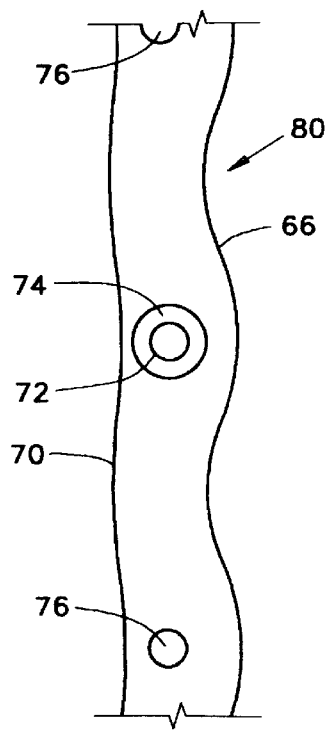
Figure 2N:
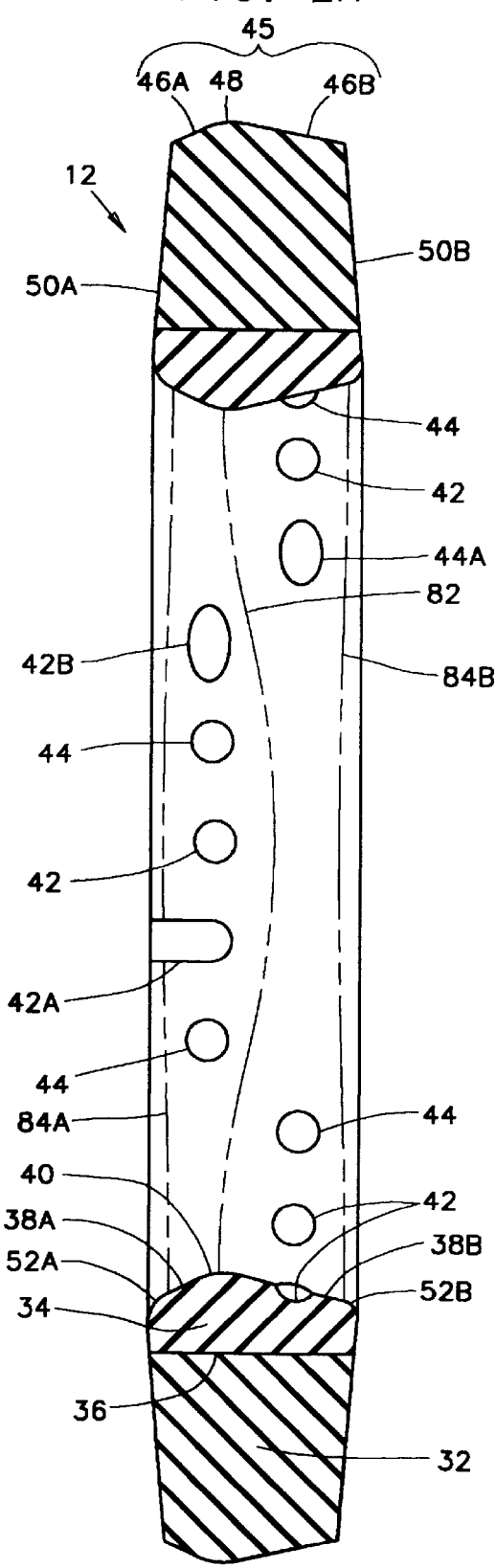
Figure 2P:
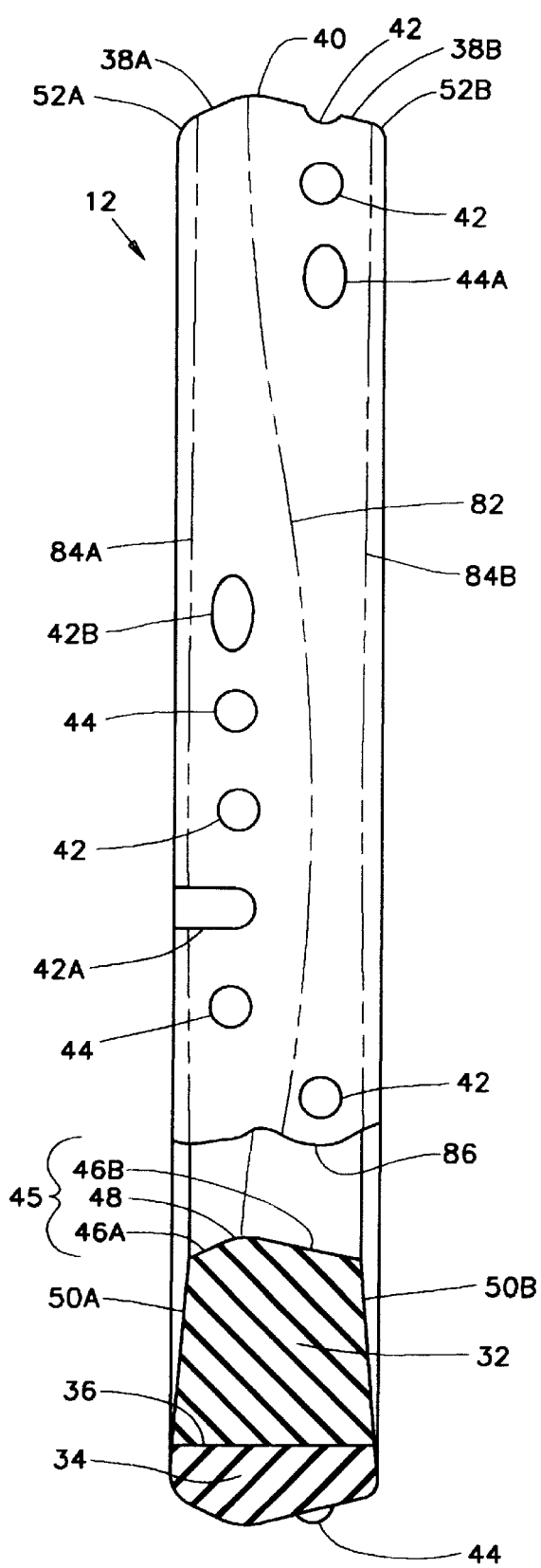

FIG. 1 is a partial longitudinal sectional view schematically illustrating relatively rotatable members and further showing a plurality of seals, one or more of which may be hydrodynamically lubricating seals establishing lubricated sealing between the relatively rotatable members;

FIG. 2A is a partial longitudinal sectional view illustrating a hydrodynamically lubricating seal representing the preferred embodiment of the present invention, the seal being shown in its uninstalled condition;

FIG. 2B is a partial longitudinal sectional view illustrating the hydrodynamically lubricating seal of FIG. 2A, the longitudinal section being taken at a different circumferential location as compared with FIG. 2A;

FIG. 2C is a partial longitudinal sectional view illustrating the hydrodynamically lubricating seal of FIGS. 2A and 2B, with the longitudinal section being taken at a different circumferential location as compared with FIGS. 2A and 2B, FIGS. 2A–2C collectively illustrating the varying width features of the primary and secondary circumferential sealing geometry of the rotary seal;

FIG. 2D is a fragmentary sectional view of relatively rotatable members and with the seal of FIGS. 2A–2C installed within an annular seal groove and illustrating its positioning within the seal groove in absence of significant differential pressure across the seal from either direction;

FIG. 2E is a fragmentary sectional view similar to that of FIG. 2D and showing deformation of the seal within the seal groove by differential pressure acting from left to right;

FIG. 2F is a fragmentary sectional view similar to that of FIGS. 2D and 2E and showing deformation of the seal within the seal groove by differential pressure acting from right to left, such as would occur upon a condition of fluid pressure reversal from the condition depicted in FIG. 2E;

FIG. 2G is a diagrammatic illustration of the interfacial contact footprint of the secondary circumferential sealing geometry of the seal of FIGS. 2A–2D, showing oppositely directed wavy edges thereof for hydrodynamic lubrication of the footprint region with respect to a relatively rotatable peripheral gland surface;

FIG. 2H is a diagrammatic illustration of the interfacial contact footprint of the primary circumferential sealing geometry of the seal of FIGS. 2A–2D, showing oppositely directed wavy edges thereof for hydrodynamic lubrication of its contact footprint with a relatively rotatable surface such as a relatively rotatable shaft diameter or shoulder or such as a relatively rotatable housing bore;

FIG. 2J is a diagrammatic illustration of the interfacial contact footprint of the pressure deformed seal condition of FIG. 2E, showing a condition where certain geometric features are completely flattened by pressure differential induced seal deformation while the wavy edge facing the fluid pressure remains for maintenance of hydrodynamic seal lubrication responsive to relative rotation;

FIG. 2K is a diagrammatic illustration of the interfacial contact footprint of the pressure deformed seal condition of FIG. 2E, showing a condition where a circumferential portion of the seal is substantially flattened by differential pressure acting across the seal but certain skewed footprint features remain to help ensure hydrodynamic lubrication of the sealing interface of the seal with the relatively rotatable surface;

FIG. 2L is a diagrammatic illustration of the interfacial contact footprint of the pressure deformed seal condition of FIG. 2F, illustrating a condition where certain geometric features are completely flattened by oppositely directed pressure differential induced seal deformation as compared with FIG. 2J while the wavy edge facing the fluid pressure remains for maintenance of hydrodynamic seal lubrication responsive to relative rotation;

FIG. 2M is a diagrammatic illustration of the interfacial contact footprint of the pressure deformed seal condition of FIG. 2L, showing a condition where a circumferential portion of the seal is substantially flattened by differential pressure acting across the seal but certain skewed footprint features remain to help ensure hydrodynamic lubrication of the sealing interface of the seal with the relatively rotatable surface;

FIG. 2N is a longitudinal sectional view of a hydrodynamically lubricated seal embodying the principles of the present invention, having dual durometer construction and showing the presence of lubricating projections, lubricating recesses, angulated sliding surfaces and angulated tilting surfaces for achieving hydrodynamic lubrication of the seal regardless of the direction of differential pressure acting on the seal;

FIG. 2P is a longitudinal sectional view of a hydrodynamically lubricated seal embodying the principles of the present invention, having dual durometer construction and having oppositely located energizing and extrusion resistant sections as compared with the seal construction of FIG. 2N;

FIG. 2Q is an elevational view of a hydrodynamically lubricated seal embodying the principles of the present invention and which is configured for axially compressed (face) sealing with respect to a relatively rotatable surface of substantially flat or planar configuration and which incorporates recesses and projections which are strategically located for enhancement of hydrodynamic lubrication.

Figure 15:
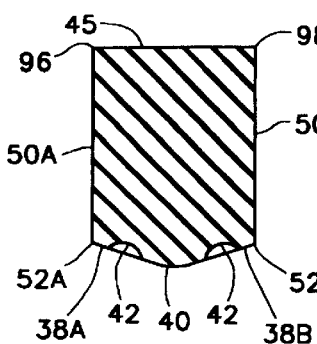
Figure 16:
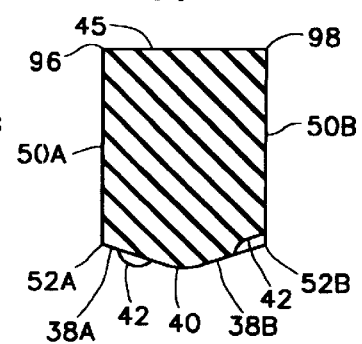
Figure 17:
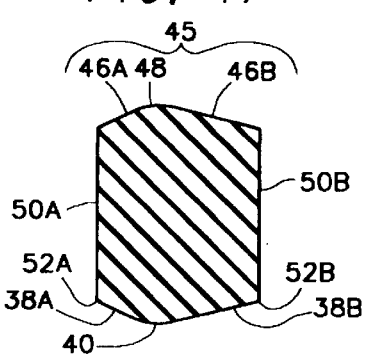
Figure 22:
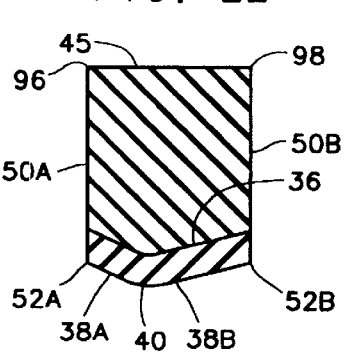
Figure 23:
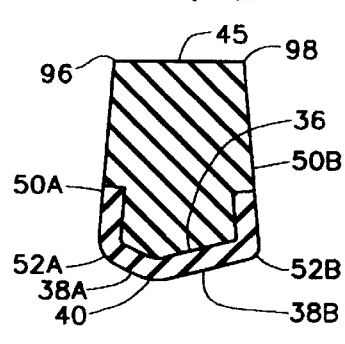
Figure 24:
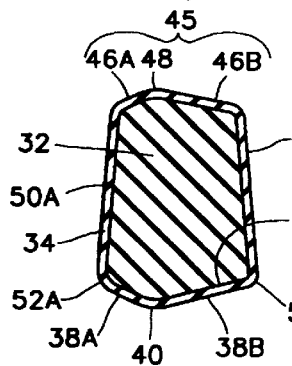
Figure 25:
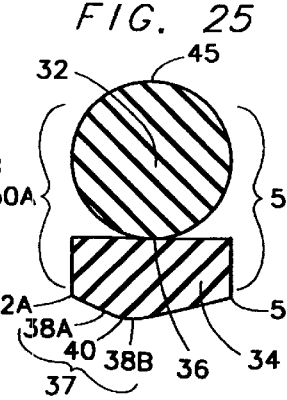
Figure 26:
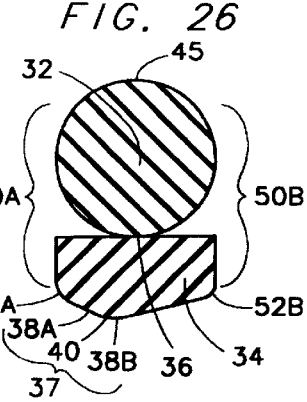
Figure 27:
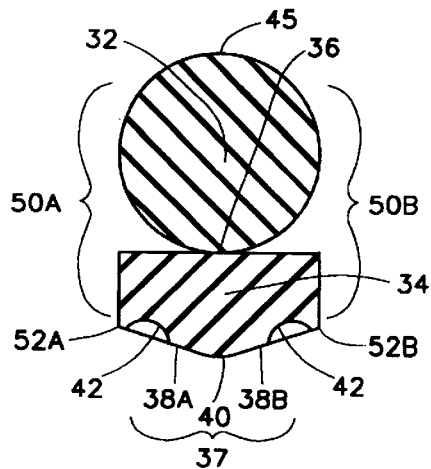
Figure 28:
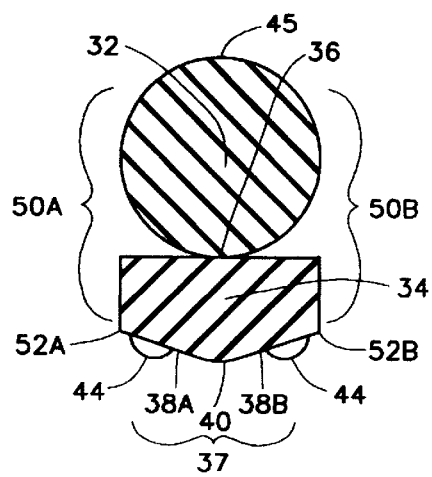
Figure 29:
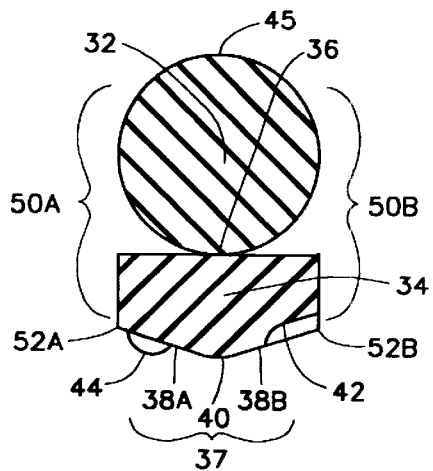
Figure 30:
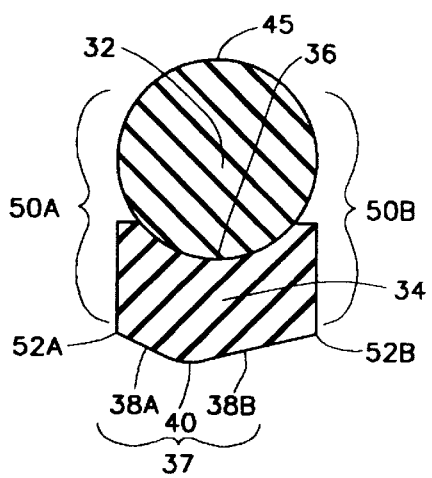
Figure 31A:
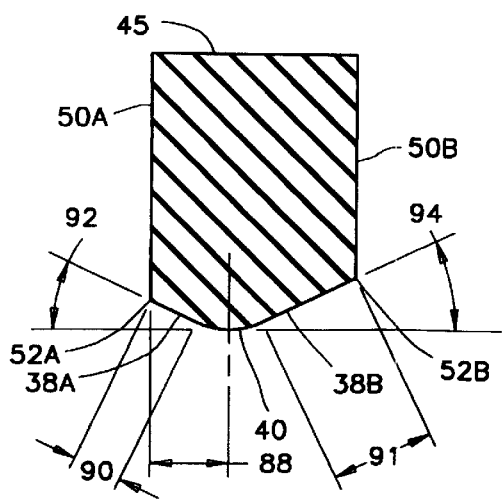
Figure 31B:
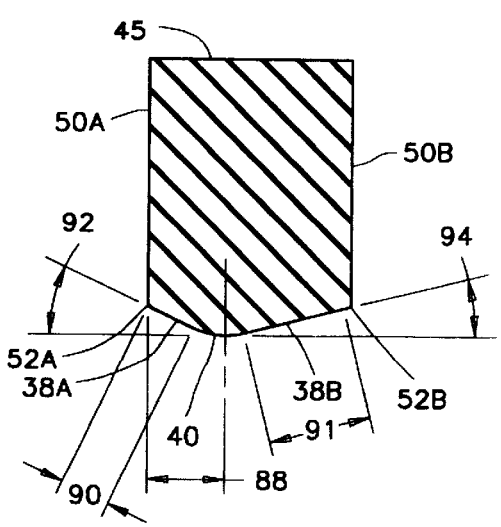

FIGS. 3–6 are partial longitudinal sectional views each showing hydrodynamic seals embodying the principles of the present invention and having substantially parallel flanks and a primary sealing geometry being defined by angulated tilting surfaces and a pivoting geometry establishing a wave configuration for hydrodynamic sealing, with the seals of FIGS. 3 and 5 being composed of a single sealing material and with the seals of FIGS. 4 and 6 being composed of differing materials;

FIGS. 7–10 are partial longitudinal sectional views similar to those of FIGS. 3–6 and which show seals having differing flank geometry and also illustrating variations in pivoting geometry;

FIGS. 11–13 are partial longitudinal sectional views showing seals of the present invention which differ in the geometry of flank corner treatment;

FIGS. 14–16 are partial longitudinal sectional views showing the seal of the present invention with abrupt flank corner treatment and being provided with lubricating features such as projections, lubricating recesses within which a lubricating fluid may be located for enhancing lubrication of the interfacial contact footprint with a relatively rotatable surface;

FIGS. 17–21 are partial longitudinal sectional views of seals embodying the principles of the present invention and having opposed primary and secondary sealing geometry;

FIGS. 22–24 are partial longitudinal sectional views showing composite seal structures having energizing and extrusion resistant sections and having varying primary sealing geometry and flank surface geometry;

FIGS. 25–30 are partial longitudinal sectional views illustrating seals embodying the principles of the present invention and illustrating the flank surfaces and angulated tilting surfaces may be comprised of curved or substantially straight sections and that the energizing and extrusion resistant sections of the seal may be defined by abutting seal component sections; and FIGS. 31A and 31B are partial longitudinal sectional views which illustrate hydrodynamic seals of the present invention having differing methods of producing angulated tilting surfaces of variable width.

DETAILED DESCRIPTION OF THE INVENTION

FIG. 1: An Improved Hydraulic Rotary Coupling Incorporating the Tilting Rotary Seal of the Present Invention The improved rotary seal of the present invention, which is discussed in detail in conjunction with FIGS. 2A–2Q, is directed at providing the improved hydrodynamic rotary coupling of FIG. 1 wherein rotary seals act as partitions to define pressure communication paths so that pressure can be communicated between relatively rotatable machine components.

Referring now to the drawings and first to the partial longitudinal section view of FIG. 1, there is shown generally at 2 the principle components of the improved rotary coupling. A relatively rotatable surface 4 of a relatively rotatable member 6 is sealed with respect to a structure 8 with either the structure 8 or the relatively rotatable member 6, or both, being rotatable. For orientation purposes, it should be understood that in the partial longitudinal cross-section of FIG. 1, the cutting plane of the cross-section passes through the longitudinal axis of the rotary seal annular bodies 12A–12E. When relative rotation occurs between structure 8 and relatively rotatable surface 4, or between rotary seal annular bodies 12A–12E and structure 8, or between rotary seal annular bodies 12A–12E and relatively rotatable surface 4, the circumferential direction of relative rotation is normal to the plane of the cross-section of FIG. 1.

Although structure 8 and relatively rotatable member 6 are each shown as being of single-piece construction, such is not intended to limit the spirit or scope of the invention, for structure 8 and/or relatively rotatable member 6 could be made up of multiple parts without departing from the spirit or scope of the invention. One or bearings (not shown) may be used to support one or both of structure 8 and relatively rotatable member 6 for rotation. Driving means, such as but not limited to one or more hydraulic motors, electric motors, pulley systems, drive shaft systems, engines, gear drives, etc. may be used to cause rotation of one or both of structure 8 and relatively rotatable member 6.

A pair of rotary seal annular bodies 12A and 12E are in outboard positions and a suitable number of rotary seal annular bodies 12B, 12C and 12D are in inboard positions. Rotary seal annular bodies 12A–12E define a plurality of pressure communication chambers 14A, 14B, 14C, and 14D for communicating fluid pressure between structure ports 16A, 16B, 16C, and 16D and mating ports 18A, 18B, 18C, and 18D. The fluid used to communicate the pressure can be of any desired type, but is typically hydraulic fluid.

It can be appreciated that while such devices use only two outboard seals, any suitable number of inboard seals can be used, depending upon the number of ports that are required in a particular application.

Each of the rotary seal annular bodies 12A–12E can be exposed to differential pressure acting from either the left or from the right, depending upon the magnitude of fluid pressure on either side of a particular seal.(Throughout this document, "right" and "left" refer to orientation relative to the figure being discussed.) For example, if the fluid pressure in pressure communication chamber 14A was 2000 PSI and the fluid pressure in pressure communication chamber 14B was 1000 PSI, a differential pressure of 1000 PSI would act across rotary seal annular body 12B from the left. Likewise, if the fluid pressure in pressure communication chamber 14B was 2000 PSI and the fluid pressure in pressure communication chamber 14A was 1000 PSI, a differential pressure of 1000 PSI would act across rotary seal annular body 12B from the right. For another example, if the fluid pressure in local environment 24A was 2000 PSI and the fluid pressure in pressure communication chamber 14A was 1000 PSI, a differential pressure of 1000 PSI would act across rotary seal annular body 12A from the left. Likewise, and as more typically encountered, if the fluid pressure in local environment 24A is 0 PSI and the fluid pressure in pressure communication chamber 14A is 2000 PSI, a differential pressure of 2000 PSI would act across rotary seal annular body 12A from the right.

Each of the rotary seal annular bodies 12A–12E can also be exposed to differential pressure of 0 PSI, depending upon the magnitude of fluid pressure on either side of a particular seal. For example, if the fluid pressure in pressure communication chamber 14A was 2000 PSI and the fluid pressure in pressure communication chamber 14B was 2000 PSI, a differential pressure of 0 PSI would act across rotary seal annular body 12B. For another example, when the fluid pressure in local environment 24A and pressure communication chamber 14A are equal, the differential pressure acting across outboard rotary seal annular body 12A is 0 PSI.

If the local environments 24A and 24B do not contain significant abrasive contaminants, rotary seal annular bodies 12A and 12E (the outboard seals) can simply be the type of seal described below in the remaining figures.

If the local environments 24A and 24B do, however, contain a significant amount of abrasive contaminants, then it is preferred that the outboard seals be prior art hydrodynamic rotary seals constructed in accordance with the teachings of commonly assigned U.S. Pat. Nos. 5,230,520, 5,738,358, or 6,120,036, which patents are incorporated herein by reference for all purposes. For abrasive environments, such prior art seals are preferred in the outboard sealing positions because they incorporate an abrupt circular non-hydrodynamic exclusionary edge on the environment side of the dynamic sealing interface, and the environment end of the seal is supported by the groove wall to resist the lubricant pressure. In accordance with the teachings of U.S. Pat. Nos. 5,230,520, 5,738,358, and 6,120,036, the dynamic sealing surface (and also the resulting dynamic sealing interface contact footprint that is established with respect to relatively rotatable surface 4), has a circular non-hydrodynamic edge for facing and excluding the environment, and has a wavy non-circular hydrodynamic edge for facing the fluid in the pressure communication chamber and for providing hydrodynamic lubrication in response to relative rotation with respect to relatively rotatable surface 4.

The rotary coupling shown in FIG. 1 may be configured for radial or for axial (face) sealing. In a face sealing configuration, relatively rotatable surface 4 may be of substantially planar configuration. In the more advantageous radial sealing configuration, relatively rotatable surface 4 may be of substantially cylindrical shape, with such cylindrical configuration optionally being of either internal or external configuration. For example, the structure 8 (which supports the seal) could be a housing surrounding relatively rotatable surface 4, and relatively rotatable surface 4 could be the outside surface of a shaft-like member. For another example, structure 8 could be a shaft or mandrel located within relatively rotatable surface 4, and relatively rotatable surface 4 could be the substantially cylindrical bore of a housing-like member. In large diameters, the cross-section of the seals of FIGS. 2A–31B (and of the seals of commonly assigned U.S. Pat. Nos. 5,230,520, 5,738,358, and 6,120,036) are typically limp enough that if made originally for a radially sealing configuration, they can simply be torsionally twisted by 90 degrees to work in a face sealing configuration, or vice-a-versa. In smaller diameter seal implementations, the seals are torsionally stiffer, and therefore it is preferred that small diameter seals be manufactured to be specifically either a radially oriented seal or an axially oriented seal, as may be required by the particular small diameter sealing application.

In the improved rotary coupling of this invention, a typical example of which is shown in FIG. 1, at least one and preferably all of the inboard rotary seals (i.e. rotary seal annular bodies 12B–12D) are of the improved tilting type disclosed hereafter in conjunction with FIGS. 2A–31B whereby the improved rotary coupling exploits the lowered rotary seal breakout and running torque, lowered seal wear and lowered relatively rotatable surface wear, and lowered seal generated heat associated with such improved tilting-type seals.

FIGS. 2A–2M: General Disclosure of the Preferred Seal Embodiment

FIGS. 2A–2M provide for a general discussion of the preferred embodiment of the hydrodynamic rotary seal of the present invention, which is generally ring-shaped, and has special features to provide low torque and to provide hydrodynamic lubrication in response to relative rotation, regardless of the direction of any differential pressure acting across the seal. FIGS. 2N–2Q show typical radial and axial configurations of the preferred seal embodiment.

FIGS. 2A, 2B and 2C show longitudinal cross-sectional views of the uninstalled rotary seal of this invention that are taken at different circumferential locations around the ring-shaped rotary seal annular body 12 in order to show the width variability of angulated tilting surfaces 38A and 38B, which cooperate with a pivoting intersection geometry 40 to form one or more waves about the circumference of primary sealing geometry 37, and in order to show the preferred width variability of angulated sliding surfaces 46A and 46B which preferably cooperate with sliding intersection geometry 48 to form one or more waves about the circumference of secondary sealing geometry 45. FIGS. 2D, 2E and 2F show longitudinal cross-sectional views of the installed rotary seal of this invention, and specifically represent the local cross-section of the seal represented by FIG. 2C. FIG. 2D shows rotary seal annular body 12 installed in the absence of significant differential pressure, FIG. 2E shows the same rotary seal annular body 12 installed and in a deformed condition caused by significant differential pressure acting across the seal from left to right, and FIG. 2F shows significant differential pressure acting across the same rotary seal annular body 12 from right to left. For orientation purposes, it should be understood that in the longitudinal cross-sections of FIGS. 2A–2F, the cutting plane of the cross-section passes through the longitudinal axis of the seal. Although FIGS. 2E and 2F specifically illustrate the local cross-section of the seal previously represented by FIG. 2C, it must be understood that the pressure responsive tilting action shown in FIGS. 2E and 2F occurs all around the circumference of the seal, regardless of the nature of the local cross-section.

The structure 8 incorporates an annular seal groove comprised of first groove wall 26, second groove wall 28, and peripheral groove wall 30 that together locate the rotary seal annular body 12 and hold it in compression against the relatively rotatable surface 4 of relatively rotatable member 6. In FIGS. 2D–2F the cutting plane also passes through the longitudinal axis of the above-described seal groove. When relative rotation occurs between structure 8 and relatively rotatable surface 4, or between rotary seal annular body 12 and structure 8, or between rotary seal annular body 12 and relatively rotatable surface 4, the circumferential direction of relative rotation is normal to the plane of the cross-section.

The present invention is equally well suited for radial or for axial (face) compression configurations. In an axial compression configuration, relatively rotatable surface 4 and peripheral groove wall 30 are preferred to be of substantially planar configuration, and first groove wall 26 and second groove wall 28 are preferred to be substantially cylindrical. In a radial compression configuration, relatively rotatable surface 4 and peripheral groove wall 30 are preferred to be of substantially cylindrical configuration, and first groove wall 26 and second groove wall 28 are preferred to be substantially planar configuration. In an implementation where relatively rotatable surface 4 is of substantially external cylindrical configuration (such as the surface of a shaft) then peripheral groove wall 30 is preferred to be of substantially cylindrical internal configuration. In an implementation where relatively rotatable surface 4 is of internal substantially cylindrical configuration (such as the bore of a housing) then peripheral groove wall 30 is of substantially cylindrical external configuration. Other configurations are possible without departing from the spirit or scope of the invention. For example, relatively rotatable surface 4 and peripheral groove wall 30 could be substantially conical. For another example, relatively rotatable surface 4 could be a substantially spherical external surface such as a portion of a ball joint, and peripheral groove wall 30 could be an internal groove wherein the peripheral groove wall 30 forms a fraction of an internal spherical shape.

Although first groove wall 26 and second groove wall 28 are shown to be in fixed, permanent relation with one another, such is not intended to limit the scope of the invention, for the invention admits to other equally suitable forms. For example, first groove wall 26 and/or second groove wall 28 could be detachable from structure 8 for ease of maintenance and repair, but assembled prior to operation to constrain rotary seal annular body 12. Although first groove wall 26 and second groove wall 28 are shown to be substantially parallel with one another, such is not intended to limit the scope of the invention, for the invention admits to other equally suitable forms. For example, the first groove wall 26 and second groove wall 28 could be angulated toward one another.

Rotary seal annular body 12 is preferably provided with an energizing section 32 preferably of relatively low modulus resilient material, such as but not limited to a compression set-resistant elastomer having a hardness in the range of 30–84 Shore A. A list of suitable materials would include but not be limited to silicone, HSN, NBR, carboxylated nitrile, FKM, and EPDM.

Rotary seal annular body 12 is preferably also provided with an extrusion resistant section 34 that preferably is constructed of a flexible material preferably having a relatively high modulus of elasticity (preferably a higher modulus than the energizing section 32) for good high pressure extrusion resistance, such as but not limited to:

1. an elastomer, and preferably an elastomer having a hardness greater than 84 Shore A, such as but not limited to HSN, NBR, FKM, EPDM, carboxylated nitrile, TFEP, and various internally lubricated elastomers,
2. an elastomer reinforced with a woven fabric such as but not limited to cotton and/or kevlar™,
3. an elastomer reinforced with particles such as but not limited to carbon black and/or fiber and/or metal and/or PTFE particles,
4. a high performance temperature resistant plastic such as but not limited to PTFE. Softer plastics such as but not limited to virgin PTFE are preferably reinforced with materials such as but not limited to glass and/or carbon and/or graphite and/or plastic fillers,
5. an abrasion resistant material such as but not limited to polyurethane.

By using a relatively low modulus material to construct energizing section 32, and using a relatively higher modulus material to construct extrusion resistant section 34, the installed seal establishes relatively low contact pressure against relatively rotatable surface 4 and peripheral groove wall 30 to provide low breakout and running torque and lowered frictional heat, while at the same time being highly resistant to being extruded into the extrusion gaps between structure 8 and relatively rotatable member 6 (i.e. extruded into the circular clearance between structure 8 and relatively rotatable member 6). Of course, as a design compromise to achieve reduced manufacturing complexity and cost, the entire rotary seal, including energizing section 32 and extrusion resistant section 34, can simply be made from the same material if desired, as will be shown later in conjunction with subsequent figures. It is preferred that energizing section 32 and extrusion resistant section 34 be bonded or integrally molded with respect to each other at sectional interface 36, however as a manufacturing simplification, energizing section 32 and extrusion resistant section 34 may optionally be simply mechanically abutted with one another at sectional interface 36. Although sectional interface 36 is shown to form a straight line in the section views of FIGS. 2A, 2B and 2C, such is not intended to limit the spirit or scope of the present invention. For example, sectional interface 36 could be a curved line, as will be shown later in conjunction with subsequent figures. As another example, energizing section 32 could be an elastomeric ring such as an O-ring that abuts with extrusion resistant section 34 at sectional interface 36 resulting in sectional interface 36 being a location of contact between energizing section 32 and extrusion resistant section 34, as will be shown later in conjunction with subsequent figures.

The multiple modulus construction of the preferred embodiment provides the extrusion resistance benefit of higher modulus (of elasticity) materials without the usual accompanying penalty of high interfacial contact pressure. The contact pressure at the dynamic sealing interface resulting from initial compression is governed by the relatively low modulus (of elasticity) of the energizing section 32 rather than by the relatively high modulus of the extrusion resistant section 34, thereby reducing breakout and running torque and self generated seal heat. Since the extrusion resistant section 34 has a significantly higher modulus than the energizing section 32, the energizing section 32 is compressed to a significantly higher percentage of compression than the extrusion resistant section 34 at installation, therefore compression has very little effect upon the shape of the primary sealing geometry 37 so that the primary sealing geometry 37 is not overly flattened against the mating relatively rotatable surface. Therefore the intended hydrodynamic wedging of lubricating fluid into the dynamic sealing interface is not impeded by any undesirable compression-induced distortion of the primary sealing geometry 37. It can also be appreciated that the minimal distortion of the primary sealing geometry 37 makes the seal tolerant of high levels of installation squeeze without causing large variations in the width of the interfacial contact footprint.

To provide geometry to establish compressed sealed relation with a relatively rotatable surface, and to provide hydrodynamic lubrication in response to relative rotation between the rotary seal and such relatively rotatable surface, the rotary seal of this invention includes a primary sealing geometry generally at 37 which is generally circular in nature and incorporates angulated tilting surfaces 38A and 38B and pivoting intersection geometry 40.

Angulated tilting surfaces 38A and 38B are disposed in angulated relation with each other and are joined by a pivoting intersection geometry 40 that is interposed (i.e. located/positioned) between and connected with angulated tilting surfaces 38A and 38B. Angulated tilting surfaces 38A and 38B have variable width about the circumference of primary sealing geometry 37, which cooperate with pivoting intersection geometry 40 to form one or more waves about the circumference of primary sealing geometry 37. The waves can take any form which is skewed with respect to the direction of relative rotation, and for example could take the form of one or more convolutions/waves of any form including a sine, saw-tooth or square wave configuration, or plural straight or curved segments forming a tooth-like pattern, or one or more parabolic curves, cycloid curves, witch/versiera curves, eliptical curves, etc. or combinations thereof, including any of the wave configurations shown in commonly owned U.S. Pat. No. 4,610,319.

The pivoting intersection geometry 40 serves as a pivot to facilitate the tilting action of angulated tilting surfaces 38A and 38B that is described herein, such that seal material pivots/rolls on the pivoting intersection geometry 40 in response to differential pressure to achieve the intended tilted seal condition shown in FIGS. 2E and 2F.

The pivoting intersection geometry 40, as shown in the longitudinal cross-section of FIGS. 2A–2C, is preferably a curve such as such as a radius, a portion of an ellipse, a portion of a sine wave curve, a portion of a parabolic curve, a portion of a cycloid curve, a portion of witch/versiera curves, or combinations thereof.

Pivoting intersection geometry 40 may, however take other specific forms without departing from the spirit or scope of the invention. For example, pivoting intersection geometry 40 could also, when viewed in longitudinal cross-section, be a combination of potentially different types of curves joined by a substantially straight portion as will be shown later. Pivoting intersection geometry 40 can, if desired, also be simply substantially abrupt (i.e. substantially sharp) corner at the intersection between angulated tilting surfaces 38A and 38B, as will be shown later.

In the preferred embodiment, angulated tilting surfaces 38A and 38B are preferably interrupted by one or more lubrication enhancement features such as lubricating recess 42 and/or lubricating projection 44. The inclusion of such preferred lubricating features in the preferred embodiment is not intended to limit the spirit or scope of the invention, however, as such features can be eliminated to save manufacturing costs, albeit at the expense of less efficient seal lubrication under certain operating conditions, as will be discussed later in conjunction with subsequent figures.

In many of the figures herein, such as in FIG. 2A, lubricating projections 44 are illustrated in a cross-sectional view, but are not cross-hatched in accordance with Section 3–4.2.1 of ANSI Y14.3-1975, an industry drawing standardization document that has been interpreted to mean that the circular body of the seal should be cross-hatched in sectional view, while the lubricating projections 44 should be drawn in outline form without cross-hatch lines to avoid conveying a false impression of circumferential solidity.

In generally opposed relation to the primary sealing geometry 37, rotary seal annular body 12 includes a secondary sealing geometry generally at 45 for establishing sealed compressed relation with a peripheral groove wall (such as peripheral groove wall 30 of FIGS. 2D–2F)

The secondary sealing geometry 45 preferably includes angulated sliding surfaces 46A and 46B that are disposed in angulated relation with each other and that are joined together by a sliding intersection geometry 48 that is interposed between and connected with angulated sliding surfaces 46A and 46B. Angulated sliding surfaces 46A and 46B preferably have a variable width about the circumference of secondary sealing geometry 45, and preferably cooperate with sliding intersection geometry 48 to form one or more waves about the circumference of the secondary sealing geometry 45. The secondary sealing geometry 45 can, however, be simplified from that shown, as will be shown later in conjunction with subsequent figures. For example, as a simplification to lower tooling costs, angulated sliding surfaces 46A and 46B could be made to have constant width, rather than varying width. As another example, the secondary sealing geometry 45 could simply be a shape corresponding generally to the shape of the mating peripheral groove wall.

The sliding intersection geometry 48, as shown in the longitudinal cross-sections of FIGS. 2A–2C, is preferably a curve such as such as a radius, a portion of an ellipse, a portion of a sine wave curve, a portion of a parabolic curve, a portion of a cycloid curve, a portion of witch/versiera curves, or combinations thereof. Sliding intersection geometry 48 may, however take other specific forms without departing from the spirit or scope of the invention, as will be shown later in conjunction with subsequent figures. For example, sliding intersection geometry 48 could also, when viewed in longitudinal cross-section, be a combination of different types of curves, or could be a combination of curved portions and straight portions, or could simply be a substantially abrupt (i.e. substantially sharp) intersection between angulated sliding surfaces 46A and 46B, as will be shown later.

Flank surfaces 50A and 50B are in substantially opposed relation and preferably converge toward one another as shown (each being preferably substantially conical) to encourage the seal to tilt in response to differential pressure and to minimize the differential-pressure induced strain on any bond that may be used at sectional interface 36, however flank surfaces 50A and 50B can take other specific form and orientation without departing from the spirit or scope of this invention, as will be shown later in conjunction with subsequent figures. For example, flank surfaces 50A and 50B could be substantially parallel to one another. As another example, flank surfaces 50A and 50B could each form slightly convex or concave surfaces. As another example, flank surfaces 50A and 50B could be formed from brief sections that are parallel to one another combined with other sections that converge toward one another. For purposes of discussion, a theoretical centerline 51 is illustrated midway between flank surfaces 50A and 50B in FIGS. 2A–2D.

Flank surface 50A and angulated tilting surface 38A are joined together by a flank corner treatment 52A that is located at the intersection there-between, and flank surface 50B and angulated tilting surface 38B are joined together by a flank corner treatment 52B that is located at the intersection there-between. Flank corner treatments 52A and 52B, as shown in the longitudinal cross-sections of FIGS. 2A–2C, are preferably a curve such as a radius or an elliptical or parabolic shape. It is preferred that flank corner treatments 52A and 52B vary in size about the circumference of rotary seal annular body 12 so as to blend the intersections in an undulating, wavy fashion in order to produce the interfacial contact footprint irregular edge 70 that is discussed later in conjunction with FIGS. 2K and 2M. For example, note that flank corner treatment 52A is relatively large in FIG. 2A compared to FIGS. 2B and 2C, and in FIG. 2B, flank corner treatment 52A is relatively small compared to FIG. 2C. Likewise flank corner treatment 52B is relatively large in FIG. 2B compared to FIGS. 2A and 2C, while in FIG. 2A, flank corner treatment 52B is relatively small compared to FIG. 2C.

Although flank corner treatments 52A and 52B are shown as being curved shapes that vary in size about the circumference of the seal in FIGS. 2A–2C, such is not intended to limit the spirit or scope of the invention, for other flank corner treatments are possible. For example, as a design simplification, the flank corner treatments 52A and 52B could be curves that do not vary in size about the circumference of the seal. For other examples, flank corner treatments 52A and 52B could also, when viewed in longitudinal cross-section, be a combination of different types of curves, or could be a combination of curved portions and straight portions, or could be a chamfer, or could simply be a substantially abrupt (i.e. substantially sharp) corner, as will be shown later in conjunction with subsequent figures.

FIGS. 2G–2M show fragmentary schematic representations of the interfacial contact footprints of the seal under various conditions of differential pressure. For orientation purposes, the direction of relative rotation for all of FIGS. 2G–2M should be visualized as being substantially aligned with substantially circular edge 68 of FIGS. 2J and 2L. The footprint geometry of FIGS. 2G–2M can be readily understood in terms of visualizing the footprint of radially compressed rotary seals of this invention, even though substantially circular edge 68 does not appear curved, because one can simply visualize the circular curvature as being oriented directly away from or directly toward the viewer. Likewise, FIGS. 2G–2M can also be used to understand the footprint of the axial/face sealing rotary seals of this invention, even though substantially circular edge 68 does not appear curved, if the diameter of the seal is simply visualized as being very large or infinite.

When rotary seal annular body 12 is compressed between peripheral groove wall 30 and relatively rotatable surface 4, interfacial contact footprints are established with respect to peripheral groove wall 30 and relatively rotatable surface 4. FIG. 2G represents the preferred interfacial contact footprint established between secondary sealing geometry 45 and peripheral groove wall 30 in the absence of substantial differential pressure acting across rotary seal annular body 12. FIG. 2H represents the preferred interfacial contact footprint established between primary sealing geometry 37 and relatively rotatable surface 4 in the absence of substantial differential pressure acting across rotary seal annular body 12.

In FIG. 2G, the interfacial contact footprint 54 has wavy edges 56A and 56B. In response to any relative rotation between secondary sealing geometry 45 and peripheral groove wall 30, wavy edges 56A and 56B produce hydrodynamic lubrication of the interfacial contact footprint 54.

In FIG. 2H, the interfacial contact footprint 58 has wavy edges 60A and 60B. In response to any relative rotation between primary sealing geometry 37 and relatively rotatable surface 4, wavy edges 60A and 60B produce hydrodynamic lubrication of the interfacial contact footprint 58.

It is preferred that wavy edges 60A and 60B be timed with one another to produce a sinuous footprint, as shown in FIG. 2H, however the wavy edges 60A and 60B could optionally be out of time with one another to produce a footprint of varying width if desired. Wavy edges 60A and 60B can be established to be in time with one another as shown in FIG. 2H simply by varying the left to right position of pivoting intersection geometry 40 about the circumference of primary sealing geometry 37 in a sinuous pattern or other suitable fashion. For example, recalling that the cross-sections of FIGS. 2A–2C are taken at different circumferential locations around the ring-like rotary seal annular body 12, pivoting intersection geometry 40 is located left of theoretical centerline 51 in FIG. 2A, approximately aligned with theoretical centerline 51 in FIG. 2C, and to the right of theoretical centerline 51 in FIG. 2B. This variation in the position of pivoting intersection geometry 40 produces the wavy footprint shown in FIG. 2H, in the absence of substantial differential pressure acting across the seal.

The reason that it is preferred that wavy edges 60A and 60B be timed with one another, as shown in FIG. 2H, is because the resulting interfacial contact footprint has less contact area (for the same minimum footprint width), and therefore less breakout and running friction, compared to the varying width footprint that would result from wavy edges 60A and 60B being out of time.

Likewise, it is preferred that wavy edges 56A and 56B be timed with one another, as shown in FIG. 2G, because the resulting interfacial contact footprint has less contact area (for the same minimum footprint width), and therefore less breakout and running friction, compared to the varying width footprint that would result from wavy edges 56A and 56B being out of time.

In the preferred embodiment, it is preferred but not required that wavy edges 56A and 56B also be substantially timed with wavy edges 60A and 60B. Another way of saying this is that it is preferred that the positional variation of pivoting intersection geometry 40 be substantially timed with the positional variation of sliding intersection geometry 48, as illustrated in FIGS. 2A–2C. By timing the positional variation of pivoting intersection geometry 40 with the positional variation of sliding intersection geometry 48, the seal is more stable in the groove (i.e. less subject to twisting in the groove in the absence of differential pressure), compared to a seal lacking such timing.

As stated above, under conditions where little or no differential pressure exists, the interfacial contact footprint 58 of FIG. 2H is hydrodynamically lubricated in response to primary sealing geometry 37 having any relative rotation with respect to relatively rotatable surface 4, just as—in the preferred embodiment—the interfacial contact footprint 54 of FIG. 2G is hydrodynamically lubricated in response to secondary sealing geometry 45 having any relative rotation with respect to peripheral groove wall 30; therefore the seal will be lubricated regardless of whether the seal slips with respect to relatively rotatable member 6 or structure 8. This aspect of the preferred embodiment is particularly important in implementations where, in conditions of little or no differential pressure acting across the seal, the location of slippage is uncertain. For example, in small diameter radially compressed seal applications, regardless of whether the mating relatively rotatable surface is of internal or external cylindrical configuration, the inside diameter of the seal has a significantly smaller radius than the outside of the seal, therefore the seal is likely to slip at the inside diameter when no differential pressure is present. However, in large diameter radially compressed seal applications, the difference between the radius of the inside of the seal and the radius of the outside of the seal is insignificant, and it is therefore difficult to predict the location of slippage. Likewise, in axially compressed seal applications of any diameter, there is substantially no difference between the radius of the interfacial contact footprint 54 and the radius of interfacial contact footprint 58, and it is difficult to predict the location of slippage. By providing for hydrodynamic lubrication at both interfaces in the preferred embodiment, it does not matter where the slippage occurs, because the seal will be lubricated regardless of the location of slippage.

As stated previously, FIG. 2E shows the preferred hydrodynamic rotary seal of this invention installed and in a deformed condition caused by differential pressure acting across the seal from left to right. In this deformed condition, rotary seal annular body 12 twists or tilts such that flank surface 50B establishes frictional contact with, and is supported by second groove wall 28, and angulated tilting surface 38B contacts and is supported by relatively rotatable surface 4. The differential pressure acting across rotary seal annular body 12 causes enough friction between flank surface 50B and second groove wall 28 to minimize or eliminate any slippage between rotary seal annular body 12 and structure 8. As a result of the twisting or tilting of rotary seal annular body 12 by the differential pressure, the shape of the interfacial contact footprint between primary sealing geometry 37 and relatively rotatable surface 4 is changed such that it no longer appears as shown in FIG. 2H.

If the differential pressure acting across the seal from left to right is high enough to flatten out the optionally preferred lubricating recesses 42, lubricating projections 44, and the variable-dimension flank corner treatment 52B, the shape of the interfacial contact footprint between primary sealing geometry 37 and relatively rotatable surface 4 appears as shown in FIG. 2J, wherein the interfacial contact footprint 64 has a wavy edge 66 caused by the varying widths of angulated tilting surfaces 38A and 38B about the circumference of primary sealing geometry 37, and the interfacial contact footprint 64 also has a substantially circular edge 68 resulting from rotary seal annular body 12 being twisted and firmly held against second groove wall 28 and relatively rotatable surface 4 by the differential pressure. FIG. 2J shows the footprint when the differential pressure is high enough that any preferred optional features such as lubricating recesses 42 or lubricating projections 44 or the variable-dimension flank corner treatment 52B are-if included-completely flattened out. The wavy edge 66 serves to hydrodynamically lubricate the interfacial contact footprint 64 in response to relative rotation between relatively rotatable surface 4 and primary sealing geometry 37.

If the differential pressure acting across the seal from left to right is not sufficient to flatten the optionally preferred features, the shape of the interfacial contact footprint between primary sealing geometry 37 and relatively rotatable surface 4 then appears generally as shown in FIG. 2K. Referring now to FIG. 2K, the interfacial contact footprint 69 has a wavy edge 66 on the side from which the differential pressure acts, just as in FIG. J. The interfacial contact footprint 69 also has an irregular edge 70 that results from the optionally preferred variation in the size of flank corner treatment 52B about the circumference of rotary seal annular body 12. The optionally preferred lubricating projections 44 establish interfacial contact islands 72 and cause local lubricating pools 74. The optionally preferred lubricating recesses 42 cause local fluid containing pockets 76 within the interfacial contact footprint. The various features of the interfacial contact footprint 69, such as the wavy edge 66, the irregular edge 70, the local lubricating pools 74, and the local fluid containing pockets 76 serve to hydrodynamically lubricate the interfacial contact footprint 69 in response to relative rotation between relatively rotatable surface 4 and primary sealing geometry 37.

As stated previously, FIG. 2F shows the rotary seal installed and in a deformed condition caused by differential pressure acting across the seal from right to left. In this deformed condition, rotary seal annular body 12 twists or tilts such that flank surface 50A establishes frictional contact with, and is supported by first groove wall 26, and angulated tilting surface 38A contacts and is supported by relatively rotatable surface 4. The differential pressure acting across rotary seal annular body 12 causes enough friction between flank surface 50A and first groove wall 26 to minimize or eliminate any slippage between the rotary seal and structure 8. As a result of the twisting or tilting of rotary seal annular body 12 by the differential pressure acting from right to left, the shape of the interfacial contact footprint between primary sealing geometry 37 and relatively rotatable surface 4 will appear as shown in FIG. 2L or FIG. 2M, depending upon the magnitude of the differential pressure.

FIG. 2L is representative of a differential pressure condition where any preferred optional features such as lubricating recesses 42 or lubricating projections 44 or the variable-dimension flank corner treatment 52A are completely flattened out against relatively rotatable surface 4 by the differential pressure. In FIG. 2L the interfacial contact footprint 78 has a wavy edge 66 and a substantially circular edge 68; i.e. essentially a mirror image to FIG. 2J. The wavy edge 66 serves to hydrodynamically lubricate the interfacial contact footprint 78 in response to relative rotation between relatively rotatable surface 4 and primary sealing geometry 37.

If the differential pressure acting across the seal from right to left is not sufficient to flatten the optionally preferred features, the shape of the interfacial contact footprint between primary sealing geometry 37 and relatively rotatable surface 4 then appears as shown in FIG. 2M; i.e. essentially a mirror image to FIG. 2K. Referring now to FIG. 2M, the interfacial contact footprint 80 has a wavy edge 66 on the side from which the differential pressure acts, just as in FIGS. J–L. The interfacial contact footprint 80 also has an irregular edge 70 that results from the optionally preferred variation in the size of flank corner treatment 52A about the circumference of rotary seal annular body 12. The optionally preferred lubricating projections 44 establish interfacial contact islands 72 and cause local lubricating pools 74. The optionally preferred lubricating recesses 42 cause local fluid containing pockets 76 within the interfacial contact footprint. The various features of the interfacial contact footprint 80, such as the wavy edge 66, the irregular edge 70, the local lubricating pools 74, and the local fluid containing pockets 76, serve to hydrodynamically lubricate the interfacial contact footprint 80 in response to relative rotation between relatively rotatable surface 4 and primary sealing geometry 37.

In this invention, no matter which direction the differential pressure acts from, the rotary seal rolls away from the pressure and creates an interfacial contact footprint with respect to the relatively rotatable surface 4 that will produce hydrodynamic lubrication in response to relative rotation. It can be appreciated the magnitude of differential pressure at which the seal rolls from the FIG. 2D condition to the FIG. 2E or 2F condition can be controlled through appropriate design to prevent rapid back and forth tilting of the seal in response to any small pressure reversals. It can further be appreciated that strategic positioning of the lubricating projections 44 can be used to help to control the pressure-responsiveness of the tilting action in a manner similar to the teachings of the projections of commonly assigned U.S. Pat. No. 6,036,192.

The lubricating recesses 42 and lubricating projections 44 can take any suitable shape, but are preferentially configured so that they are hydrodynamically lubricated in response to relative rotation; this implies that they present a gradually converging shape with the relatively rotatable surface in the circumferential direction so as to create a fluid wedging action.

To understand the hydrodynamic lubrication that occurs between the seal and the relatively rotatable surface in response to relative rotation, it must be understood that the various features of the primary sealing geometry 37 and the optional lubricating recesses 42 and lubricating projections 44 produce an interfacial contact footprint having at least some edge-portions that are skewed with respect to the direction of relative rotation. As relative rotation takes place, the skewed edges hydrodynamically force a film of lubricating fluid into the interfacial contact footprint. This lubricating fluid film prevents the typical dry rubbing type wear and blistering heat damage associated with conventional non-hydrodynamic interference type seals, and thereby prolongs seal and mating surface life and makes higher service pressures and higher speeds practical.

To further clarify the preferred embodiment of the present invention, as discussed above in conjunction with FIGS. 2A–2M, typical radially compressed and axially compressed configurations are shown in FIGS. 2N–2Q and discussed below.

FIGS. 2N–2P: Typical Radially Compressed Configuration of the Preferred Seal Embodiment FIGS. 2N and 2P illustrate typical examples of the preferred embodiment of the hydrodynamic rotary seal of this invention as configured for radially compressed sealing. The rotary seal of FIG. 2N is configured for sealing against a relatively rotatable surface (not shown) of external cylindrical configuration such as a shaft. The rotary seal of FIG. 2P is configured for sealing against a relatively rotatable surface not shown) of internal cylindrical configuration such as a bore. The rotary seal annular bodies 12 of FIGS. 2N and 2P each have angulated tilting surfaces 38A and 38B that are joined by a pivoting intersection geometry 40, and each of the angulated tilting surfaces 38A and 38B are preferred have one or more optional lubrication enhancement features such as lubricating recess 42 and/or lubricating projection 44. Any suitable number and configuration of such features may be used, and in any desired sequence. Note that lubricating recess 42A is an open ended recess that extends to and intersects with the left-hand side of rotary seal annular body 12, which adds to the skewed, non-circular effect of irregular edge 70 of interfacial contact footprint 69 and interfacial contact footprint 80 of FIGS. 2K and 2M to help produce lubrication from the low pressure side of the seal.

Also note that lubricating recess 42B and lubricating projection 44 are of generally oval shape; other shapes are possible without departing from the spirit or scope of the invention. In FIGS. 2N and 2P, the theoretical intersection that is addressed by pivoting intersection geometry 40 is represented by phantom line 82. The outside edges of angulated tilting surfaces 38A and 38B are blended by flank corner treatments 52A and 52B which preferably vary in size about the circumference of the seal. The transition between angulated tilting surface 38A and flank corner treatment 52A is shown by phantom line 84A; this transition is preferred to be wavy as shown to produce hydrodynamic lubrication; the waviness is due to the size variation of flank corner treatment 52A. The transition between angulated tilting surface 38B and the optionally preferred flank corner treatment 52B is shown by phantom line 84B; this transition is also preferred to be wavy as shown to produce hydrodynamic lubrication; the waviness is due to the size variation of flank corner treatment 52B about the circumference of rotary seal annular body 12. In FIG. 2P, a portion of the seal is broken away at break line 86 so that the longitudinal cross-sectional configuration of the seal can be observed. In FIGS. 2N and 2P, in generally opposed relation to angulated tilting surfaces 38A and 38B, rotary seal annular body 12 includes a secondary sealing geometry 45 that preferably includes two angulated sliding surfaces 46A and 46B. The previous discussion (in conjunction with the previous figures) of angulated sliding surfaces 46A and 46B, sliding intersection geometry 48, flank surfaces 50A and 50B, energizing section 32, extrusion resistant section 34, and sectional interface 36 is also applicable to FIGS. 2N and 2P.

FIG. 2Q: Typical Axially Compressed Configuration of the Preferred Seal Embodiment FIG. 2Q illustrates the preferred embodiment of the hydrodynamic rotary seal of this invention as configured for axially compressed (face) sealing against a relatively rotatable surface (not shown) of substantially flat or planar configuration such as a the shoulder of a shaft. The rotary seal of FIG. 2Q has angulated tilting surfaces 38A and 38B that are joined by a pivoting intersection treatment (not shown), and each of the angulated tilting surfaces 38A and 38B are preferred have one or more lubrication enhancement features such as lubricating recess 42 and/or lubricating projection 44 of any desired configuration and sequence. In FIG. 2Q, the theoretical intersection between angulated tilting surfaces 38A and 38B is represented by phantom line 82. The edges of angulated tilting surfaces 38A and 38B are terminated by flank corner treatments 52A and 52B. The transition between angulated tilting surface 38A and the optionally preferred flank corner treatment 52A is shown by phantom line 84A; this transition is preferred to be wavy as shown for hydrodynamic lubrication purposes; the waviness is due to the size variation in flank corner treatment 52A as discussed previously in conjunction with other figures. The transition between angulated tilting surface 38B and the optionally preferred flank corner treatment 52B is shown by phantom line 84B; this transition is preferred to be wavy as shown for hydrodynamic lubrication purposes; the waviness is due to the size variation in flank corner treatment 52B. To show the direct correlation between FIG. 2Q and the section views of FIGS. 2A–2C, note that FIG. 2A is applicable at cutting plane 2A of FIG. 2Q, and note that FIG. 2B is applicable at cutting plane 2B of FIG. 2Q, and note that FIG. 2C is applicable at cutting plane 2C of FIG. 2Q. The seal of FIG. 2Q is illustrated as only having two waves; such is not intended to limit the spirit or scope of the invention for it admits to the use of any desired number of waves; the same is also true of the radial sealing configurations shown in FIGS. 2N and 2P.

Introduction to FIGS. 3–31B

FIGS. 3–31B are partial longitudinal cross-sectional illustrations that represent alternate embodiments of the generally ring-shaped interference-type rotary seal of the present invention in the uninstalled, uncompressed condition, including:

1. Seals having feature variations that fall within the spirit and scope of the invention, and/or
2. Simplified seals that eliminate specific features of the preferred embodiment to achieve commercially useful cost/performance compromises for applications having reduced operating severity and/or life requirements.

As with the previously discussed preferred embodiment, each of the rotary seals shown in FIGS. 3–31B include a primary sealing geometry 37 that is generally circular in nature and incorporates angulated tilting surfaces 38A and 38B that are joined by pivoting intersection geometry 40. Angulated tilting surfaces 38A and 38B have variable width around the circumference of the primary sealing geometry 37, and cooperate with pivoting intersection geometry 40 to form one or more waves around the circumference of the primary sealing geometry 37. The waves can be of any desired shape.

As with the previously discussed preferred embodiment, each of the rotary seals shown in FIGS. 3–31B include a secondary sealing geometry 45 in generally opposed relation to the primary sealing geometry 37 for establishing sealed compressed relation with a peripheral groove wall.

As with the previously discussed preferred embodiment, each of the rotary seals shown in FIGS. 3–31B include flank surfaces 50A and 50B and flank corner treatments 52A and 52B.

IN FIGS. 3–31B, when relative rotation occurs between the rotary seal and the relatively rotatable surface (not shown) or optionally between the rotary seal and the peripheral groove wall (not shown), the circumferential direction of relative rotation is normal to the plane of the cross-section.

As with the previously discussed preferred embodiment, each of the rotary seal embodiments shown in FIGS. 3–31B are generally ring-like, and may be configured as desired for radially compressed sealing against a cylindrical surface, or for axially compressed sealing against a flat surface, or for diagonally compressed sealing against a spherical or conical surface, etc. As previously discussed, in the case of relatively large diameter seals, primary sealing geometry 37 can if desired simply be manufactured as an internally oriented geometry configured for sealing against a relatively rotatable surface defining an externally oriented cylindrical surface, then be twisted for use against an internally oriented surface, a substantially planar surface, etc. This is because the cross-section of a large diameter seal is torsionally limp, and can be twisted 180 degrees so that primary sealing geometry 37 becomes an externally oriented geometry configured for sealing against a bore, or twisted 90 degrees so that primary sealing geometry 37 becomes an axially oriented geometry configured for sealing against a planar surface, etc. The relative torsional stiffness of small diameter seals is higher, making twisting less practical, and with small seals it is preferred that primary sealing geometry 37 be manufactured to the required orientation configuration.

All of the seals herein can be configured so fit within ISO 7425-type grooves if desired.

Detailed Discussion of FIGS. 3–31B

The rotary seals of FIGS. 3, 5, 7–21, 31A, and 31B are made from a single material (rather than the preferred two-material construction of the preferred embodiment) as a design simplification to achieve significant cost savings in the manufacture of the rotary seals, and the tooling that produces them. The trade-offs associated with using single material construction typically relate to higher torque and lower extrusion resistance. The material used to form the seals should be a resilient material such as but not limited to silicone, HSN, NBR, FKM, and EPDM, carboxylated nitrile, TFEP, polyurethane, various internally lubricated elastomers, and various fabric and/or particle reinforced elastomers As preferred with the preferred embodiment of FIGS. 2A–2Q, the seals of FIGS. 4, 6, and 22–30 are of preferably of dual material construction, wherein an energizing section 32 of preferably relatively low modulus (of elasticity) resilient material is provided, and an extrusion resistant section 34 is provided that preferably is constructed of a flexible material preferably having a relatively high modulus of elasticity (preferably higher modulus than the energizing section 32). FIGS. 22, 23, 24, and 30 show that, when viewed in longitudinal cross-section, sectional interface 36 can be of curved configuration or a combination of curves and substantially straight portions. It can be appreciated that in the seal of FIG. 30 the sectional interface 36 can either be an abutment location or a bond location, as desired. FIG. 23 shows that extrusion resistant section 34 can wrap at least partially around energizing section 32; this construction is especially useful when extrusion resistant section 34 is comprised of a fabric reinforced elastomer. FIG. 24 shows that extrusion resistant section 34 can if desired encapsulate energizing section 32; this is especially useful when extrusion resistance is also required at secondary sealing geometry 45. Such encapsulation is also useful when extrusion resistant section 34 can be constructed of a chemically resistant material such as PTFE to protect the energizing section 32 from chemical attack. FIGS. 25–30 show that energizing section 32 can be a resilient ring such as an O-ring that abuts or is bonded or integrally manufactured with extrusion resistant section 34 at sectional interface 36. It can of course be appreciated that the resilient ring shown as an O-ring can take other specific cross-sectional form without departing from the spirit or scope of the invention, such as hexagonal, obround, elliptical, etc., and the mating shape of sectional interface 36 can be configured to match.

The breakout friction of a compression type resilient seal is due to the compressive force displacing lubricating fluid from the surface finish of the relatively rotatable mating surface over time, and the resilient seal material flowing into and engaging/interlocking with the surface finish. One of the advantages of the dual material construction described herein, where the material forming the primary sealing geometry 37 is harder than the energizing section 32, is that the breakout friction is typically much less than that of a single material seal. This is because the hard material doesn't flow into the surface finish of the relatively rotatable surface as much as a softer material would, and because the interfacial contact pressure can be regulated to a relatively low value if desired. The feature of low breakout friction is important in many types of equipment, and is considered to be a valuable aspect of the dual material embodiments of this invention.

The seals of FIGS. 2A–31B shuttle within the annular seal groove in response to the introduction of differential pressure, and in response to changes in the direction of differential pressure. The shuttling motion breaks the primary sealing geometry 37 away from the surface finish of the relatively rotatable surface, and forces some lubricating fluid into the sealing interface between the primary sealing geometry 37 and the relatively rotatable surface, which helps to lower seal torque at that interface. This shuttling motion can have a dramatic effect in terms of reducing breakout torque when conditions of high differential pressure exist.

Pressure-responsive shuttling can also introduce fluid between secondary sealing geometry 45 and the mating peripheral groove wall. In applications where such fluid introduction is not desired, it can be minimized by providing squeegee corners 96 and 98 which provide an abrupt film breaking geometry. Also, by causing flank surfaces 50A and 50B to diverge further apart from each other near the secondary sealing geometry 45, as shown in FIG. 7, the shuttling motion is minimized at secondary sealing geometry 45, which helps to minimize fluid introduction between and the mating peripheral groove wall.

As with the preferred embodiment of FIGS. 2A–2Q, the pivoting intersection geometry 40 of FIGS. 5, 6 and 8–31B is preferably a curve due the efficiency provided by a curved shape in terms of hydrodynamic lubrication. As shown in FIG. 7, pivoting intersection geometry 40 can also be two curved portions 40A and 40C joined by a substantially straight portion 40B; experiments by the inventors and their associates have shown that such geometry is also conducive to hydrodynamic lubrication in response to relative rotation. FIGS. 3 and 4 show that if desired from a simplification standpoint, pivoting intersection geometry 40 can simply be a corner at the intersection between angulated tilting surfaces 38A and 38B; such simplicity is possible because the angle of angulated tilting surfaces 38A and 38B with respect to the relatively rotatable surface can be made small enough to produce hydrodynamic lubrication in response to relative rotation without the desirable benefit of pivoting intersection geometry 40 being curved.

Figure 19:
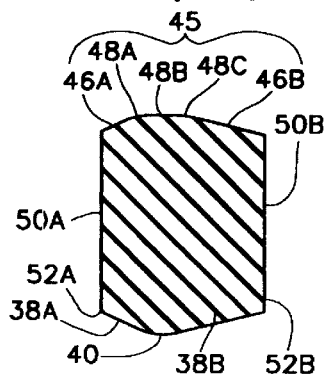
Figure 20:
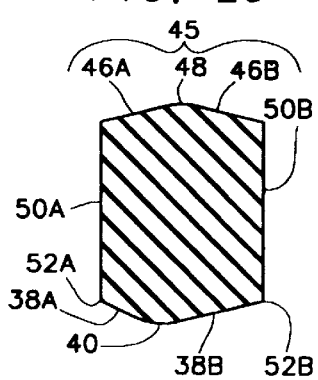
Figure 21:
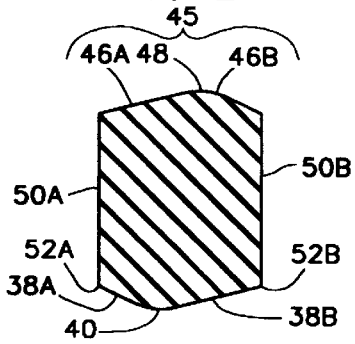

As with the preferred embodiment of FIGS. 2A–2Q, in the seals of FIGS. 17–21 and 24, the secondary sealing geometry 45 includes angulated sliding surfaces 46A and 46B that are joined together by a sliding intersection geometry 48 that is interposed between and connected with angulated sliding surfaces 46A and 46B. As with the preferred embodiment of FIGS. 2A–2Q, in the seals of FIGS. 17, 18, 19 and 21 the angulated sliding surfaces 46A and 46B are both preferred to have a variable width about the circumference of secondary sealing geometry 45 and preferably cooperate with sliding intersection geometry 48 to form one or more waves around the circumference of secondary sealing geometry 45 which are conducive to hydrodynamic lubrication in response to relative rotation; the waves can be of any desired shape. In FIGS. 17–19 and 24, as with the preferred embodiment, the one or more waves formed by sliding intersection geometry 48 are preferred to be substantially in time with the one or more waves formed by cooperation between angulated tilting surfaces 38A and 38B and pivoting intersection geometry 40. In FIG. 21, the one or more waves formed by secondary ceiling geometry 45 are, as a design alternative, out of time with the one or more waves formed by cooperation between angulated tilting surfaces 38A and 38B and pivoting intersection geometry 40.

In FIG. 20 the angulated sliding surfaces 46A and 46B of the secondary sealing geometry 45 are of constant width about the circumference of the seal forming a simple sealing lip shape; this is a design simplification for applications where hydrodynamic lubrication at the interface with the peripheral groove wall is not needed. IN FIGS. 25–30, the secondary sealing geometry 45 is curved when viewed in longitudinal cross-section. In FIGS. 3–16, 22, 23, 31A and 31B the secondary sealing geometry 45 is a substantially straight shape when viewed in longitudinal cross-section; i.e. simply corresponding to the general shape of the mating peripheral groove wall. This too is a design simplification for applications where hydrodynamic lubrication at the interface with the peripheral groove wall not needed. This simplification, and that of FIG. 20, results in a substantial reduction in the cost of tooling by allowing lathe work to be substituted for complex mill work.

Figure 18:
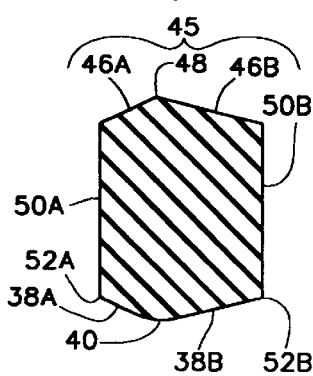

As with the preferred embodiment of FIGS. 2A–2Q, in the seals of FIGS. 17, 20, 21 and 24 the sliding intersection geometry 48, when viewed in longitudinal cross-section, is preferably a curve due the efficiency provided by a curved shape in terms of hydrodynamic lubrication. Sliding intersection geometry 48 may, however take other specific forms without departing from the spirit or scope of the invention. For example, as shown in FIG. 19, sliding intersection geometry 48 can also, when viewed in longitudinal cross-section, be a combination of curved portions 48A and 48C and straight portion 48B. FIG. 18 shows that if desired for the sake of simplicity, sliding intersection geometry 48 can simply be a corner at the intersection between angulated sliding surfaces 46A and 46B; such simplicity is possible because the angle of angulated sliding surfaces 46A and 46B with respect to the peripheral groove wall can be made small enough to produce hydrodynamic lubrication in response to relative rotation without the desirable benefit of sliding intersection geometry 48 being curved.

As with the preferred embodiment of FIGS. 2A–2Q, in the seals of FIGS. 13, 23, 24 and 26, flank corner treatments 52A and 52B are preferably curved when viewed in longitudinal cross-section, and preferably vary in size about the circumference of rotary seal annular body 12 so as to blend the intersections in an undulating, wavy fashion in order to produce an interfacial contact footprint irregular edge 70 as was discussed in conjunction with FIGS. 2K and 2M.

Although it is preferred that flank corner treatments 52A and 52B be curved shapes that vary in size about the circumference of the seal, such is not intended to limit the spirit or scope of the invention, for other flank corner treatments are possible. For example, as a design simplification, as shown in FIG. 11, the flank corner treatments 52A and 52B could be curves of constant, rather than varying, size. Flank corner treatments 52A and 52B could also be chamfers as shown in FIG. 12, or could simply be substantially abrupt (i.e. substantially sharp) corners, as shown in FIGS. 3–10, 14–22, 25, and 27–31B. A corner break of any kind is preferred to a substantially abrupt (i.e. substantially sharp) corner, however, in terms of extrusion resistance. In response to differential pressure, a corner break initially flexes toward the extrusion gap between the structure and the relatively rotatable member, and considerable differential pressure is required to force seal material in to the extrusion gap. If flank corner treatments 52A and 52B are substantially abrupt (i.e. substantially sharp) corners, seal material is extruded much quicker, compared to when corner breaks of some kind are used to define flank corner treatments 52A and 52B. Referring momentarily to FIG. 1, the extrusion gaps between the relatively rotatable member 6 and the structure 8 can change dynamically due to such things as component pressure breathing, runout associated with relative rotation, and component deflection. Any seal material forced (by differential pressure) to extrude or bulge into the extrusion gap can potentially be subjected to a high level of stress, because the extrusion gap dimensional changes can be very large compared to the size of the extruded material, and the number of dimensional changes can be quite high. For example, the local extrusion gap can vary dynamically due to dynamic runout, which can impose thousands of fatigue cycles on the extruded material in a very short period of time. With the preferred embodiment wherein the flank corner treatments 52A and 52B define corner breaks, as the dimension of the extrusion changes, the flank corner treatments 52A and 52B absorbs the lateral movement over a relatively long distance so the average strain is kept below the fatigue limit of the seal material.

As in the preferred embodiment of FIGS. 2A–2Q, in the simplified and alternate embodiments now being discussed the angulated tilting surfaces 38A and 38B can if desired be interrupted by one or more lubrication enhancement features such as lubricating recess 42 and/or lubricating projection 44, as shown in FIGS. 14, 15, 16, and 27–29.

As in the preferred embodiment of FIGS. 2A–2Q, flank surfaces 50A and 50B may converge closer to one another toward the secondary sealing geometry 45 as shown in FIGS. 8, 9, 10, 23, and 24. In FIGS. 8, 23, and 24 the flank surfaces 50A and 50B are substantially conical as described in conjunction with the preferred embodiment. In FIG. 9, flank surfaces 50A and 50B are formed from short sections that are parallel to one another combined with other sections that converge toward one another. In FIG. 10, flank surfaces 50A and 50B are generally convex. The rotary seals of FIGS. 3–6, 11–22, 31A and 31B show that flank surfaces 50A and 50B can, as a design simplification, be arranged to be substantially equidistant (i.e. parallel) to each other to permit simplified dimensional inspection of the distance between flank surfaces 50A and 50B. The inventors have determined that with some seal material and pressure combinations, differential pressure alone is sufficient to cause the desired tilting action of angulated tilting surface 38B without the need for flank surfaces 50A and 50B to converge toward each other. FIGS. 25–30 show that flank surfaces 50A and 50B can also be comprised of a combination of curved and substantially straight sections, and FIG. 7 shows that if desired the flank surfaces 50A and 50B can diverge further apart from one another toward the secondary sealing geometry 45, as discussed previously.

As stated previously in conjunction with the preferred embodiment and elsewhere, pivoting intersection geometry 40 is interposed (i.e. located/positioned) between and connected with angulated tilting surfaces 38A and 38B. Also as previously stated, angulated tilting surfaces 38A and 38B have variable width about the circumference the rotary seal, and cooperate with pivoting intersection geometry 40 to form one or more waves about the circumference of the primary sealing geometry 37. The waves thus cooperatively defined establish the wavy edges 60A and 60B of interfacial contact footprint 58 of FIG. 2H, and also establish the wavy edge 66 of the interfacial contact footprints of FIGS. 2J–2M, and thus serve to produce hydrodynamic lubrication of the interface between primary sealing geometry 37 and the mating relatively rotatable surface in response to relative rotation. There are several useful ways to cause angulated tilting surfaces 38A and 38B to have variable width about the circumference the rotary seal in cooperation with pivoting intersection geometry 40 to form one or more waves about the circumference the primary sealing geometry 37, as described hereafter.

In FIG. 31A, angles 92 and 94 remain constant about the circumference of the seal and are preferred to be equal to each other as well, and the respective widths 90 and 91 of angulated tilting surfaces 38A and 38B vary simultaneously about the circumference of the seal-one becoming wider as the other gets equally narrower-thus cooperating with the interposed pivoting intersection geometry 40 to form one or more waves about the circumference of the primary sealing geometry 37.

In FIG. 31B (and in many other figures herein, although the angles are not specifically labeled), angles 92 and 94 vary about the circumference of the seal, cooperating to cause simultaneous variations of the respective widths 90 and 91 of angulated tilting surfaces 38A and 38B about the circumference of the primary sealing geometry 37—one becoming wider as the other gets equally narrower-thus cooperating with the interposed pivoting intersection geometry 40 to define one or more waves about the circumference of the primary sealing geometry 37. With a view toward simplifying the tooling required to make the seals and reducing the cost thereof, angles 92 and 94 can also be made to cooperate (if desired) to make flank corner treatments 52A and 52B circular, which reduces mold parting line complexity.

In FIG. 14, as in all the figures herein, it is also the intention that angulated tilting surfaces 38A and 38B vary in width about the circumference of the seal. It can be appreciated in reference to FIG. 14 that the angulated tilting surfaces 38A and 38B can be caused to vary in width by either varying the position or the size (or both) of pivoting intersection geometry 40 about the circumference of the seal, thus cooperating with pivoting intersection geometry 40 to define one or more waves about the circumference of the primary sealing geometry 37. Likewise, in reference to FIG. 7, one can optionally cause variation in the width of angulated tilting surfaces 38A and 38B in cooperation with pivoting intersection geometry 40 to define one or more waves about the circumference of the primary sealing geometry 37 by varying the size and/or position of substantially straight portion 40B of pivoting intersection geometry 40.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. An interference type hydrodynamic seal for location within an annular seal groove subject to fluid pressure and for hydrodynamically lubricated sealing with a relatively rotatable surface, comprising:

(a) an annular seal body (12) having a primary sealing geometry (37) establishing a sealing circumference and having a secondary sealing geometry (45) being disposed in substantially opposed relation with said primary sealing geometry (37), said annular seal body (12) defining a first flank surface (50A) and a second flank surface (50B) disposed in substantially opposed relation;

(b) said primary sealing geometry (37) having a first angulated tilting surface (38A) and a second angulated tilting surface (38B) disposed in angular relation and varying in width about the circumference of said primary sealing geometry (37); and (c) pivoting intersection geometry (40) being interposed between and connected with said first and second angulated tilting surfaces (38A–38B) and cooperating therewith to define at least one wave on said primary sealing geometry (37).

2. The interference type hydrodynamic seal of claim 1, comprising:

said pivoting intersection geometry (40) and said first and second angulated tilting surfaces (38A–38B) providing for substantially pivotal positioning of said annular seal body (12) to a first position where said first angulated tilting surface (38A) is oriented for hydrodynamic sealing and to a second position where said second angulated tilting surface (38B) is oriented for hydrodynamic sealing.

3. The interference type hydrodynamic seal of claim 1, comprising:

said pivoting intersection geometry (40) being in the form of a curve.

4. The interference type hydrodynamic seal of claim 1, comprising:

said pivoting intersection geometry (40) being in the form of a substantially abrupt corner.

5. The interference type hydrodynamic seal of claim 1, comprising:

said pivoting intersection geometry (40) being defined by a first curved portion (40A) and a second curved portion (40C) joined by a substantially straight portion (40B).

6. The interference type hydrodynamic seal of claim 1, comprising:

said opposed first and second flank surfaces (50A–50B) being disposed in substantially parallel relation.

7. The interference type hydrodynamic seal of claim 1, comprising:

said opposed first and second flank surfaces (50A–50B) being disposed in diverging relation.

8. The interference type hydrodynamic seal of claim 1, comprising:

said opposed first and second flank surfaces (50A–50B) being disposed in converging relation.

9. The interference type hydrodynamic seal of claim 1, comprising:

(a) said first angulated tilting surface (38A) and said first flank surface (50A) being joined by first flank corner treatment (52A); and (b) said second angulated tilting surface (38B) and said second flank surface (50B) being joined by second flank corner treatment (52B); and (c) at least one of said first and second flank corner treatments (52A–52B) being a curve.

10. The interference type hydro dynamic seal of claim 1, comprising:

(a) said first angulated tilting surface (38A) and said first flank surface (50A) being joined by a first flank corner treatment (52A); and (b) said second angulated tilting surface (38B) and said second flank surface (50B) being joined by a second flank corner treatment (52B); and (c) at least one of said first and second flank corner treatments (52A–52B) being a curve varying in dimension about the circumference of said annular seal body (12).

11. The interference type hydrodynamic seal of claim 1, comprising:

(a) said first angulated tilting surface (38A) and said first flank surface (50A) being joined by a first flank corner treatment (52A); and (b) said second angulated tilting surface (38B) and said second flank surface (50B) being joined by a second flank corner treatment (52B); and (c) at least one of said first and second flank corner treatments (52A–52B) being a chamfer.

12. The interference type hydrodynamic seal of claim 1, comprising:

(a) said first angulated tilting surface (38A) and said first flank surface (50A) being joined by a first flank corner treatment (52A); and (b) said second angulated tilting surface (38B) and said second flank surface (50B) being joined by a second flank corner treatment (52B); and (c) at least one of said first and second flank corner treatments (52A–52B) being a substantially abrupt corner.

13. The interference type hydrodynamic seal of claim 1, wherein annular seal body (12) comprising:

(a) an energizing section (32) being formed of a resilient material having a defined modulus of elasticity; and (b) an extrusion resistant section (34) being formed of a resilient material having a modulus of elasticity exceeding said defined modulus of elasticity, said extrusion resistant section defining at least a portion of said primary sealing geometry (37).

14. The interference type hydrodynamic seal of claim 13, comprising:

said energizing section (32) defining said secondary sealing geometry (45).

15. The interference type hydrodynamic seal of claim 13, comprising:

said energizing section (32) and said extrusion resistant section (34) being disposed in abutting relation with one another.

16. The interference type hydrodynamic seal of claim 13, comprising:

said energizing section (32) and said extrusion resistant section (34) being bonded together.

17. The interference type hydrodynamic seal of claim 1, wherein said secondary sealing geometry comprising:

first and second angulated sliding surfaces (46A–46B) joined together by sliding intersection geometry (48).

18. The interference type hydrodynamic seal of claim 17, wherein:

(a) said first and second angulated sliding surfaces (46A–46B) vary in width and cooperate with said sliding intersection geometry (48) to define at least one wave on said secondary sealing geometry (45).

19. The interference type hydrodynamically lubricated seal assembly of claim 18, comprising:

said at least one wave on said primary sealing geometry (37) and said at least one wave on said secondary sealing geometry (45) being substantially timed with one another.

20. The interference type hydrodynamically lubricated seal assembly of claim 18, comprising:

said at least one wave on said primary sealing geometry (37) and said at least one wave on said secondary sealing geometry (45) being out of time with one another.

21. The interference type hydrodynamic seal of claim 17, wherein:

said sliding intersection geometry (48) being in the form of a curve.

22. The interference type hydrodynamic seal of claim 17, wherein:

said sliding intersection geometry (48) being in the form of a substantially abrupt corner.

23. The interference type hydrodynamic seal of claim 1, comprising:

at least one of said first and second angulated tilting surfaces (38A–38B) defining at least one lubricating projection (44).

24. The interference type hydrodynamic seal of claim 1, comprising:

at least one of said first and second angulated tilting surfaces (38A–38B) defining at least one lubricating recess (42).

25. An interference type hydrodynamic seal for location within an annular seal groove subject to fluid pressure and for hydrodynamically lubricated sealing with a relatively rotatable surface, comprising:

(a) an annular seal body (12) having a primary sealing geometry (37) establishing a sealing circumference and having a secondary sealing geometry (45) being disposed in substantially opposed relation to said primary sealing geometry (37), said annular seal body (12) defining first and second flank surfaces (50A–50B) being disposed in opposed relation;

(b) an energizing section (32) being formed of a resilient material having a defined modulus of elasticity, said energizing section (32) defining said secondary sealing geometry (45), and an extrusion resistant section (34) being formed of a resilient material having a modulus of elasticity exceeding said defined modulus of elasticity, said extrusion resistant section (34) defining at least a portion of said primary sealing geometry (37);

(c) said primary sealing geometry (37) having first and second angulated tilting surfaces (38A–38B) disposed in angular relation and varying in width about the circumference of said primary sealing geometry (37) and having pivoting intersection geometry (40) being interposed between and connected with said first and second angulated tilting surfaces (38A–38B) and cooperating with said first and second angulated tilting surfaces (38A–38B) to define at least one wave on said primary sealing geometry (37);

(d) said first angulated tilting surface (38A) and said first flank surface (50A) being joined by first flank corner treatment (52A) and said second angulated tilting surface (38B) and said second flank surface (SOB) being joined by second flank corner treatment (52B), at least one of said first and second flank corner treatments (52A–52B) being a curve varying in dimension about the circumference of said annular seal body (12);

(e) said secondary sealing geometry (45) having first and second angulated sliding surfaces (46A–46B) disposed in angular relation and varying in width and having sliding intersection geometry (48) being interposed between and connected with said first and second angulated sliding surfaces (46A–46B) and cooperating therewith to define at least one wave on said secondary sealing geometry (45);

(f) at least one of said first and second angulated tilting surfaces (38A) and (38B) defining at least one lubricating projection (44); and (g) at least one of said first and second angulated tilting surfaces (38A–38B) defining at least one lubricating recess (42).

26. A hydrodynamically lubricated seal assembly comprising:

(a) a relatively rotatable surface (4);

(b) at least one interference type hydrodynamic seal, comprising:

(1) an annular seal body (12) having a primary sealing geometry (37) establishing sealed relation with said relatively rotatable surface (4), and having a secondary sealing geometry (45) being disposed in substantially opposed relation to said primary sealing geometry (37), said annular seal body (12) defining first and second opposed flank surfaces (50A–50B);

(2) said primary sealing geometry (37) having a circumference and having first and second angulated tilting surfaces (38A–38B) disposed in angular relation and varying in width about the circumference of said primary sealing geometry (37); and (3) pivoting intersection geometry (40) being interposed between and connected with said first and second angulated tilting surfaces (38A–38B) and cooperating with said angulated tilting surfaces (38A–38B) to define at least one wave on said primary sealing geometry (37); and (c) a structure (8) being located in close proximity with said relatively rotatable surface (4) and supporting said at least one interference type hydrodynamic seal.

27. A sealing assembly (2) comprising:

(a) a structure (8);

(b) a relatively rotatable member (6) being capable of relative rotation with respect to said structure (8);

(c) at least two interference type rotary seals (12A–12B) that act as partitions to define at least one pressure communication chamber (14A) for communicating a fluid having a fluid pressure between at least one structure port (16A) and at least one mating port (18A), wherein the structure (8) defines at least one annular seal groove for locating one of said at least two rotary seals, said at least one annular seal groove being comprised of a at least a first groove wall (26) and a peripheral groove wall (30), at least one of said rotary seals (12A, 12B) establishing an interfacial contact footprint (68) with said relatively rotatable member (6), said at least one of said rotary seals (12A–12B) having at least one flank surface (50A) being angulated with respect to said first groove wall (26); and (d) said at least one flank surface (50A) tilting into contact with said first groove wall (26) responsive to said fluid pressure and causing said interfacial contact footprint (68) to have at least one wavy edge (66) establishing a hydrodynamic geometry.

* * * * *

UNITED STATES PATENT AND TRADEMARK OFFICE
CERTIFICATE OF CORRECTION

PATENT NO.   : 6,561,520 B2
DATED        : May 13, 2003
INVENTOR(S)  : Kalsi et al.

It is certified that error appears in the above-identified patent and that said Letters Patent is hereby corrected as shown below:

<u>Column 25,</u>
Line 30, delete "hydro dynamic", and insert -- hydrodynamic --

<u>Column 27,</u>
Line 27, delete "SOB", and insert -- 50B --

<u>Column 28,</u>
Lines 38 and 45, delete "68", and insert -- 78 --

Signed and Sealed this

Eleventh Day of May, 2004

JON W. DUDAS
*Acting Director of the United States Patent and Trademark Office*